United States Patent [19]
Yeh et al.

[11] Patent Number: 5,180,214
[45] Date of Patent: Jan. 19, 1993

[54] SERVO-TYPE PHASE-LOCKED LOOP ANTI-SKID BRAKE CONTROL SYSTEM

[75] Inventors: Edge C. Yeh, Hsinchu; Jiunn Y. Wang, MiaoLi, both of Taiwan

[73] Assignee: National Science Council, Taiwan

[21] Appl. No.: 815,818

[22] Filed: Dec. 30, 1991

[51] Int. Cl.$^5$ .............................................. B60T 8/82
[52] U.S. Cl. .................................. 303/111; 303/110; 364/426.02
[58] Field of Search .................... 303/95, 96, 103, 110, 303/111; 364/426.01–426.03

[56] References Cited

U.S. PATENT DOCUMENTS

| | | | |
|---|---|---|---|
| 3,838,889 | 10/1974 | Miller | 303/92 X |
| 4,033,633 | 7/1977 | Miller et al. | 303/95 X |
| 4,040,677 | 8/1977 | Bleckmann | 303/95 X |
| 4,224,568 | 9/1980 | Griner | 303/95 X |
| 4,583,173 | 4/1986 | Odlen et al. | 364/426.03 |
| 4,683,538 | 7/1987 | Guichard | 364/426.01 |
| 4,762,375 | 8/1988 | Maki et al. | 303/103 X |
| 4,832,415 | 5/1989 | Shinomiya | 303/103 X |
| 5,015,042 | 5/1991 | Yoshino | 303/103 X |

Primary Examiner—Robert J. Oberleitner
Assistant Examiner—Alfred Muratori
Attorney, Agent, or Firm—Ladas & Parry

[57] ABSTRACT

An anti-skid brake control system (ABS) utilizing a phase-locked loop (PLL) for controlling the brake mechanism of a landing aircraft. The PLL control system tracks the angular velocity of the nose wheel of the aircraft as a reference signal for locking the angular velocity of the main wheel of the aircraft such that the wheel slip is maintained at a constant value. The PLL control system has a phase detector which takes the signals from both wheel speed detectors and is capable of generating accordingly a frequency error signal and a phase error signal. A circuit will generate an electrical signal, the magnitude of the electrical signal being in accordance with the magnitude of the frequency error signal and the magnitude of the phase error signal. A driving member will drive in accordance with the magnitude of the electrical signal the brake mechanism connected to the main wheel to apply a brake force thereto. The main wheel thus braked will cause the aircraft to be decelerated, the deceleration of the aircraft in turn cause the angular speed of the nose wheel and the main wheel to be slowed down. The slowed-down speeds are in turn detected by the wheel detectors and thus forming a feedback loop.

6 Claims, 30 Drawing Sheets

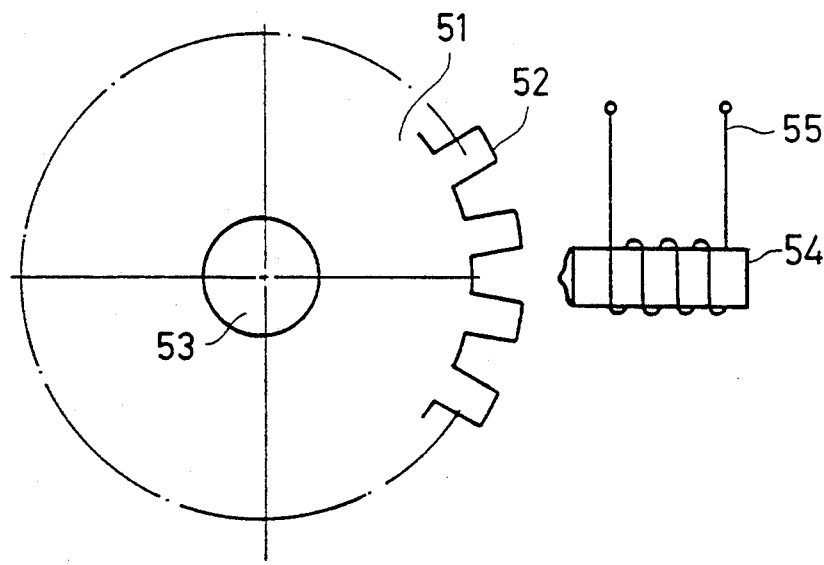
FIG. 3A
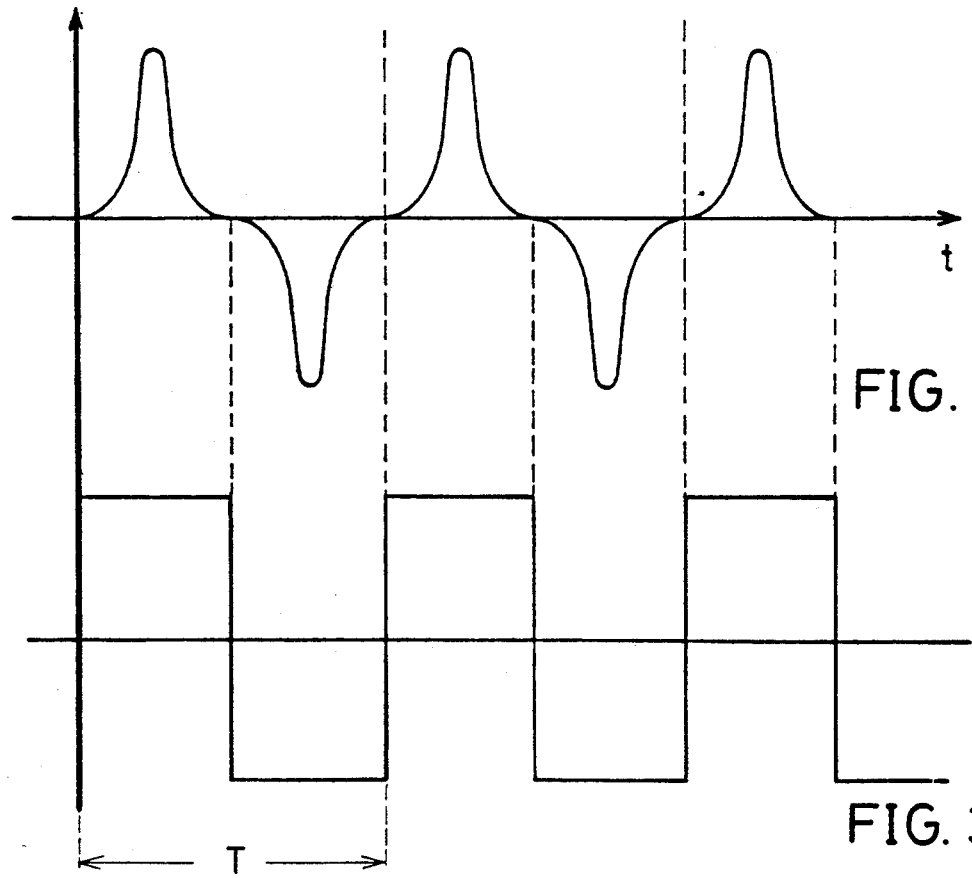
FIG. 3B
FIG. 3C

SERVO-TYPE PHASE-LOCKED LOOP ANTI-SKID BRAKE CONTROL SYSTEM

BACKGROUND OF THE INVENTION

The present invention relates to a brake control system of a vehicle, and more particularly, to a brake control system which employs a phase-locked loop (PLL) scheme and is primarily used in a fast moving vehicle to stop the vehicle in a short distance while prevent the vehicle from skidding.

As will be hereinafter illustrated, the present invention is specifically referred to as an "Anti-Skid Brake System (ABS)" and which is primarily used in an aircraft with landing gears including a set of nose wheels and a set of main wheels. The purpose of the present invention is to provide the aircraft with a brake control system which controls the brake force applied to the main wheels such that the aircraft, when landing, would come to a stop in a shortest distance while prevent the aircraft from skidding out of the runway.

In a landing aircraft, the brake force is generally only applied to the main wheels while the nose wheels undergo free rolling. If a brake force is overly applied to the main wheel, the main wheel may undergo a slip. It is therefore the primary object of the present invention and the aforementioned patents to apply an appropriate braking force to the main wheel. It is generally known that slip of the wheels will occur if the brake force is overly applied to the main wheels. Should this condition takes place, the effects of the braking would be deteriorated and the high-speed moving aircraft may go through a dangerous situation as to skid out of runway. Consequently, the braking mechanism has to be controlled to apply an appropriate braking force to the main wheels. The optimal braking force is such that it would stop the landing aircraft in a shortest distance while slip would not be caused to the wheels.

Various control systems have been devised for the anti-skid brake control system. In U.S. Pat. No. 2,914,359, Yarber disclosed an "Anti-Skid Brake Control System" which mainly used mechanical devices to prevent vehicle skidding. In U.S. Pat. No. 2,906,376, Zeigler disclosed a "Non-skid Braking System Using Pre-set Pulsing Action" which measured the angular deceleration of the aircraft wheels and accordingly control a solenoid valve to modulate the braking force. And in U.S. Pat. No. 3,245,727, Anderson et al disclosed an "Anti-Skid Brake Control System" which measured the wheel slip as a feedback signal to control a hydraulic servo-valve.

In addition to the aforementioned patents, numerous engineering papers have been published discussing other schemes for the anti-skid brake control system. In summary, these control schemes utilize feedback signals including the angular deceleration of the main wheel, the slip, and the slip-velocity for modulating the braking force on the main wheels of the aircraft.

The phase-locked loop concept, which was originated from the field of radio communications, is rapidly expanding into other areas of application such as speed control of DC motors. The main idea of PLL is to synchronize the output signal with a reference signal in frequency as well as in phase. Referring to FIG. 1, the output signal of a VCO 12 is fed back to a phase detector 10 which compares with the feedback signal with the input signal. The phase error generated thereby from the phase detector 10 is first filtered by a low-pass loop filter 11 to retain average voltage, and then the PLL circuit forces the output frequency of the VCO 12 to change in a direction that reduces the frequency difference between the feedback signal and the input signal. In the synchronized state, often called locked state, the phase error between the output signal of the VCO 12 and the reference signal is fixed. Therefore, the frequency of the reference signal is locked.

SUMMARY OF THE INVENTION

It is an object of the present invention to provide a brake control system for an aircraft in which braking force is dependent on the rotational speeds of the main wheel and the nose wheel.

It is another object of the present invention to provide a brake control system for an aircraft in which a phase-locked loop is utilized.

It is another object of the present invention to provide a brake control system for an aircraft in which the noise which is common to an electronic control circuit and affect the performances thereof is minimized.

It is another object of the present invention to provide a brake control system for an aircraft in which the processing of signals is real-time.

It is another object of the present invention to provide a brake control system for an aircraft in which the braking mechanism is prevented from operating in a saturation state to output a braking force that is out of control.

It is another object of the present invention to provide a brake control system for an aircraft in which a comprising circuit block thereof is capable of generating simultaneous a signal indicating the frequency error and a signal indicating the phase error of two input signals.

It is another object of the present invention to provide a brake control system for an aircraft in which a pressure bias input is provided for maintaining the braking force applied by the braking mechanism to the main wheel in an appropriate range.

The objects of the present invention are fulfilled by providing a phase-locked loop anti-skid brake control system for the aircraft, which comprises a wheel speed detector mounted on a nose wheel, and another wheel speed detector mounted on the main wheel upon which the braking force is exerted. The wheel speed detectors are both capable of sending out a periodic signal, the frequency of which indicating the angular speed of the wheel. A phase detector takes the signals from both wheel speed detectors and is capable of generating accordingly a frequency error signal and a phase error signal. A means will generate an electrical signal, the magnitude of the electrical signal being in accordance with the magnitude of the frequency error signal and the magnitude of the phase error signal. A driving means will drive in accordance with the magnitude of the electrical signal the brake mechanism connected to the main wheel to apply a brake force thereto. The main wheel thus braked will cause the aircraft to be decelerated, the deceleration of the aircraft in turn cause the angular speed of the nose wheel and the main wheel to be slowed down. The slowed-down speeds are in turn detected by the wheel detectors and thus forming a feedback loop.

The above PLL system configuration comprises no computing means so that the processing of the signals therein is real-time.

The periodic signal generated by the wheel speed detector passes a Schmitt trigger before being input to the phase detector for converting to a signal with periodic square waveforms. The digitization of the signal thus diminish the noise level.

The phase detector comprises an up-down counter coupled to a D/A converter. The combination acts as a integrator over time of the frequency difference between its two input signals and the output thereof is substantially the phase error of the two input signals.

BRIEF DESCRIPTION OF THE DRAWINGS

The present invention can be more fully understood by a reading to the subsequent detailed description of the preferred embodiments with references made to the accompanying figures, wherein:

FIG. 3A is an schematic illustration, showing the configuration of a wheel speed detector;

FIG. 3B is a graph, showing the waveform of the output of the wheel speed detector;

FIG. 3C is a graph, showing the waveform of the output of a Schmitt trigger connected to the wheel speed detector shown in FIG. 3A;

DETAILED DESCRIPTION OF THE PREFERRED EMBODIMENTS

Figure 2:
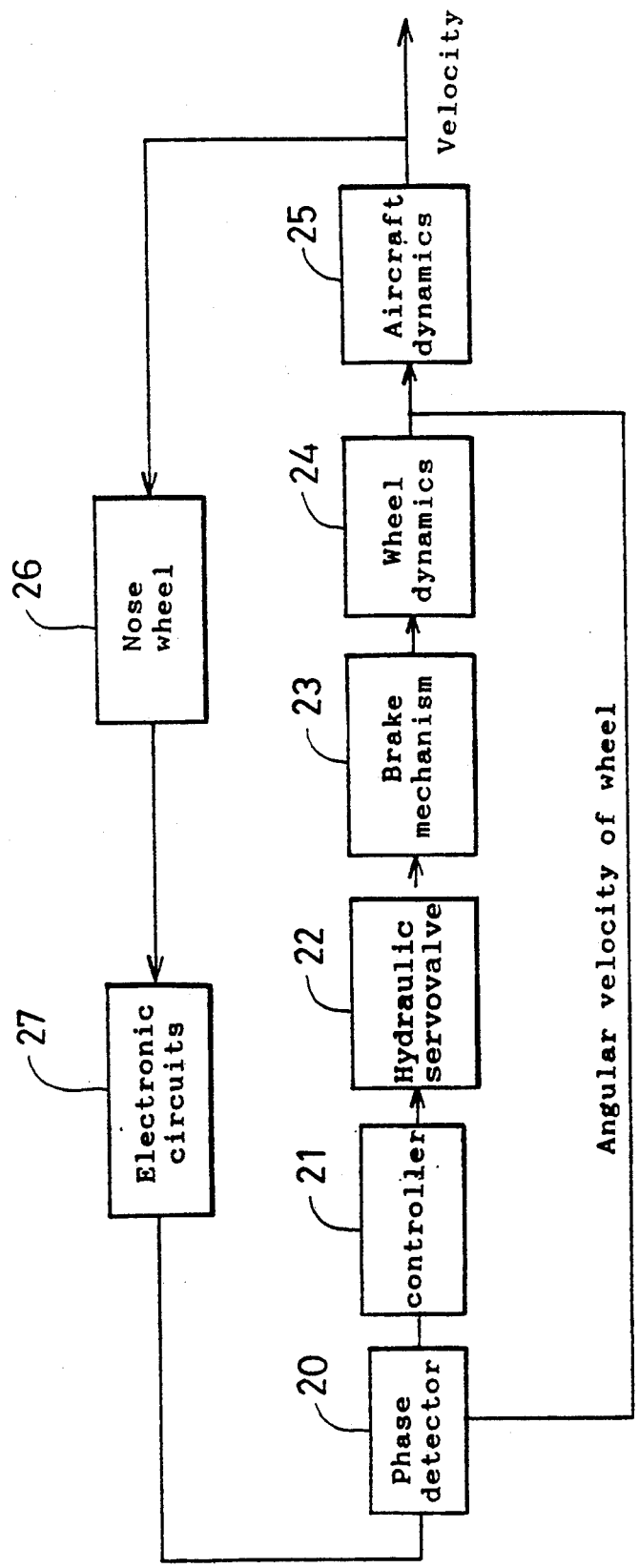
FIG. 2 is a schematic block diagram of the PLL anti-skid brake control system according to the present invention.
Figure 4:
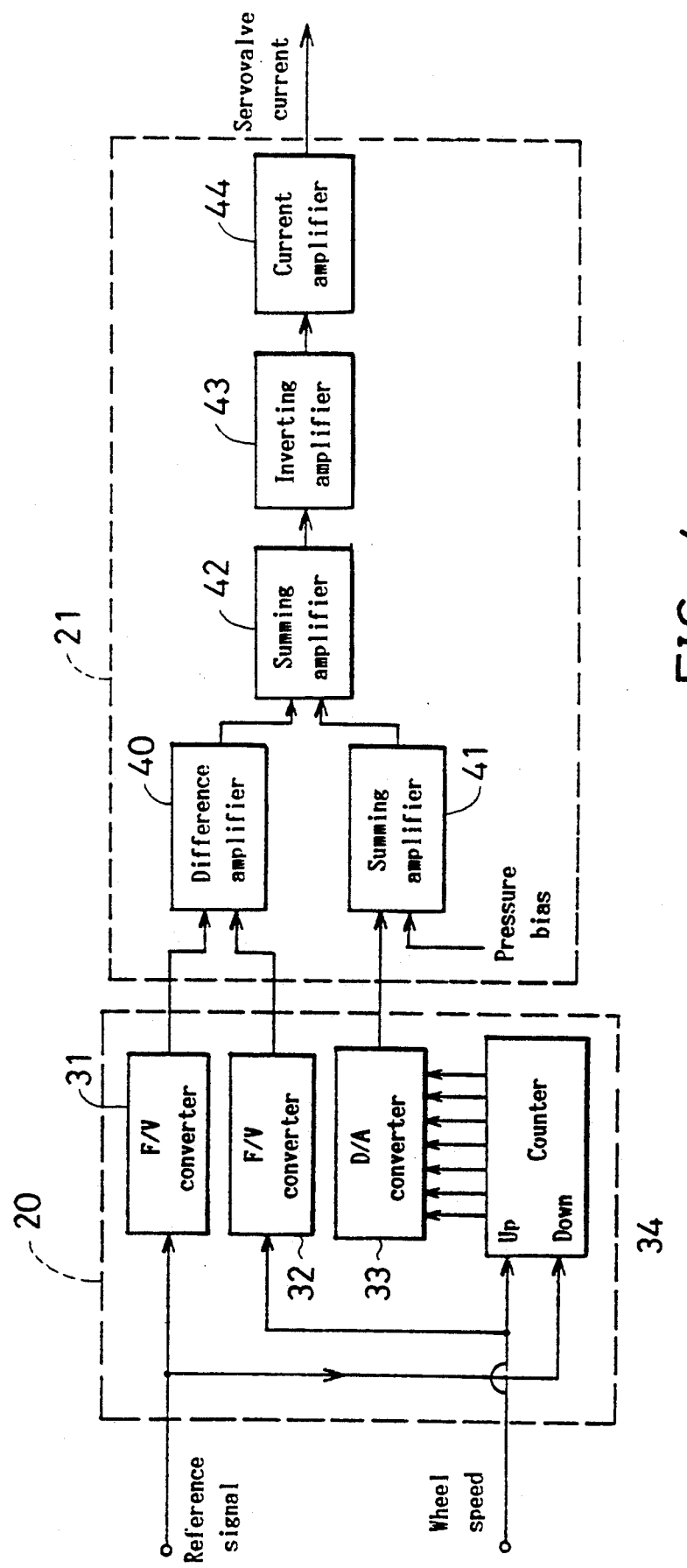
FIG. 4 is a circuit block diagram of a phase detector utilized in the present invention.

Firstly in this description section, a preferred embodiment of the present invention will be illustrated and described with the associated references made to FIGS. 2-4. Thereafter the theoretical background of the present invention, including the theoretical method for selecting the best design parameters for the preferred embodiment, will be described with the associated references made to FIGS. 5-25.

"Wheel slip" is defined as a ratio of the difference between the aircraft speed and the product of the angular velocity and the radius of the aircraft wheel to the aircraft speed. If we let $V_1$ designate the linear speed of an aircraft, $w_m$ designate the angular velocity of a main wheel of the aircraft, $r_m$ designate the radius of the main wheel, and S designates the wheel slip, then S is given by:

$$S = (V_1 - w_m * r_m)/V_1,$$

or $$S = 1 - (w_m * r_m / V_1).$$

Figure 1:
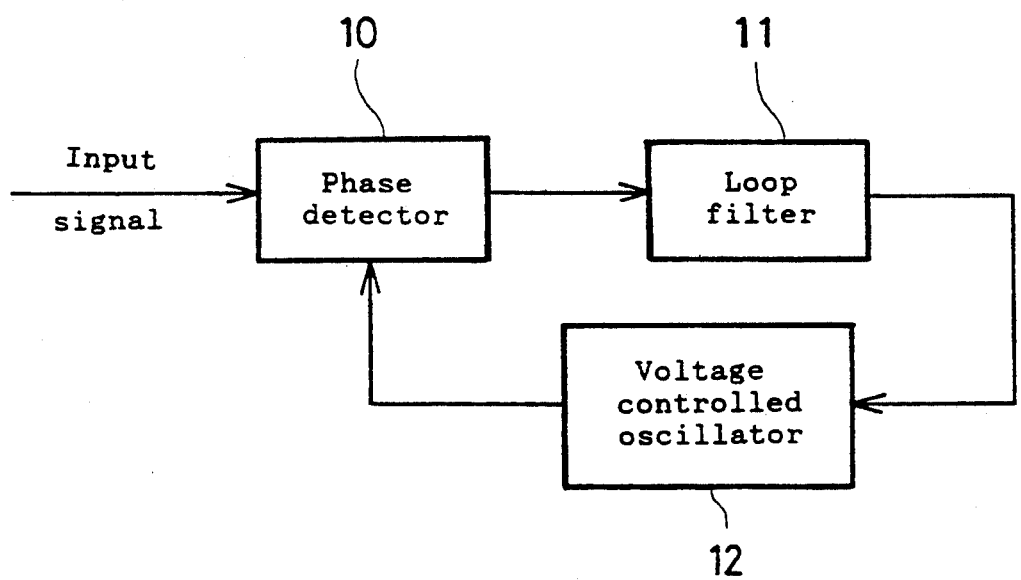
FIG. 1 is a block diagram of a typical phase-locked loop.

Experimentally, the maximum brake force for the wheel occurs when the value of the wheel slip is about 0.15. On the right hand side of the above equation, only $r_m$ is a non-changing constant, $V_1$ is associated with the aircraft speed, and $w_m$ can be modulated by the braking force. Therefore, it is the basic principle of the present invention to keep the value of the wheel slip substantially constant at 0.15 by continually monitoring the linear speed of the aircraft $V_1$ and using a PLL control system to adjust accordingly the angular velocity $w_m$ of the main wheel. Since $V_1$ is substantially equal to $w_n * r_n$, where $w_n$ is the angular velocity of the nose wheel and $r_n$ is the radius of the nose wheel, the angular velocity of the nose wheel $w_n$ can thus be utilized in the PLL system as the reference signal for the modulation of the braking force which controls the angular speed of the main wheel. Accordingly, the angular speed of the main wheel in this PLL scheme for ABS is equivalent to the VCO output described in FIG. 1.

A. SYSTEM DESCRIPTION

Referring to FIG. 2, a schematic block diagram shows the system configuration of the PLL control system for ABS according to the present invention. The blocks are comprised of a phase detector 20, a controller 21, a hydraulic servovalve 22, a brake mechanism 23, and the wheel dynamics 24. Compared with the typical structure of PLL, the braked main wheel can be regarded equivalently as the VCO since it produces the output angular speed which is under the control of the input current of the servovalve. On the other hand, the brake system is also a low-pass loop filter since it is a mechanical device with limited bandwidth.

The analog signals measured from the electromagnetic speed transducers on the main wheel and the nose wheel are cut into square waves and then compared in the special phase detector 20 which will be described in detail later. The output error voltage of the phase detector 20 is in the form of a dc voltage rather than in the form of a high frequency square wave. Under proper control, this error voltage is used to actuate the electrohydraulic pressure control servovalve 22. The hydraulic pressure is hence produced to drive the brake mechanism 23, and the aircraft dynamics 25 and the angular speed of the nose wheel 26 are changed accordingly. It is desired that the main wheel speed will track the desired angular velocity to obtain the maximum brake force. Each block of FIG. 2 will be modeled and described in detail later in this description section.

Referring to FIGS. 3A-3C, there are shown the arrangement of the variable reluctance transducer used to detect the angular velocity of the main wheel and the signal generated thereby. As shown in FIG. 3A, the transducer comprises a circular disk 51 which is made of ferromagnetic material and having a plurality of gear-like teeth 52 provided around the circumference thereof; and a permanent magnet 54 wound by a coil 55 along the direction of magnetic flux thereof. The center 53 of the circular disk 51 is coaxially connected to the shaft of a wheel which is either the main wheel or the nose wheel. As the circular disk 51 rotates, each tooth 52 thereof will pass through the magnetic field of the permanent magnet 54 such that an electrical potential is induced across the two free ends of the coil 55. The electrical potential will thus appear periodically and the waveform thereof is shown in FIG. 3B.

As can be seen from FIG. 3B, the waveform of the signal generated by the variable reluctance transducer is somewhat irregular. Therefore, a Schmitt trigger 27 or 29 is coupled to the output of the variable reluctance transducer to convert the irregular waveform into a square-wave.

The speed signals from the main wheel and the nose wheel are fed into the phase detector 20. The block diagram of the detector 20 and the controller 21 coupled to the output thereof is shown in FIG. 4. As shown, the phase detector 20 includes an up-down counter 34, a D/A (digital-to-analog) converter 33 and a pair of F/V (frequency to voltage) converters 31, 32. Each of the F/V converters 31, 32 produces an output voltage which is proportional to the frequency of its input signal. The up-down counter 34 has a counter register and two input ports, UP and DOWN. A leading edge of a square waveform input to the UP port will add 1 to the binary digit stored in the counter register of the up-down counter 34, and a leading edge of a square waveform input to the DOWN port will subtract 1 therefrom. The counter register of the up-down counter 34 is connected via a parallel data bus to the D/A converter 33 which is capable of producing accordingly an analog output voltage. The magnitude of the analog voltage is directly proportional to the binary value stored in the counter register of the up-down counter 34. If the counter register of the up-down counter 34 is empty (all digits are 0), the output voltage of the D/A converter 33 is zero. While if the counter register is full (all digits are 1), the output voltage is at the maximum value. In fact, the output voltage is proportional to the time integral of the frequency error and is thus defined here as a phase error $\Theta_e$ which has the characteristics of $\Theta_e = w - w^*$. Due to the overflow and underflow characteristics of the up-down counter 34, the range of the phase error $\Theta_e$ will be defined to be limited or confined in the range from 0 to $2\pi$ in this scheme. Therefore, when $\Theta_e$ is out of the range from 0 to $2\pi$, it will be transformed back to be within this range by taking its modulus of $2\pi$.

The output from the D/A converter 33 is termed the phase error signal of the angular velocities of the nose wheel and the main wheel; and the output from the difference amplifier is termed the frequency error signal of the same.

The controller 21 is coupled to the output of the phase detector 20. The output ports of the two F/V converters are connected to a difference amplifier 40. The difference amplifier 40 is capable of producing an output voltage with a value equal to the difference between the value of the two input voltages. As shown, the controller 21 further comprises a summing amplifier 41 which adds a constant pressure bias voltage to the phase error signal. The reason of applying the pressure bias voltage will be discussed and explained later in the description of the theoretical background of the present invention. The controller 21 further comprises another summing amplifier 42. The output of the summing amplifier 42 is therefore a summation of the phase error signal, the frequency error signal, and the pressure bias. An inverting amplifier 43 further shifts the phase of this output signal by 180°. A current amplifier 44 is used for amplifying the phase-shifted signal to an appropriate amplitude.

In addition, it will be noticed that the output signal w is fed back positively into the phase detector 20 since it causes the phase error to increase, while the reference signal w* is fed forwards negatively. This is different from the conventional way of feedback, and a detailed analysis will be given later in the description.

Three design parameters have to be carefully chosen for the PLL system described above. These design parameters includes:

(1) the gain of the frequency error signal,
(2) the gain of the phase error signal, and
(3) the pressure bias.

The choosing of the three design parameters is based both on theoretical assumptions and empirical results. For this, the theoretical analysis and simulation of the system will be described next along with the proposal of some guidelines in choosing the best, or optimal, design parameters.

B. THEORETICAL BACKGROUND OF THE PRESENT INVENTION

1.1 PLL Control Scheme for ABS

The motivation of applying the concept of PLL to ABS is to control the angular velocity of the main wheels of an aircraft to lock the reference signal from the nose wheel of the same to obtain the maximum brake force. Since the nose wheel is not braked and thus rolls freely, a reference signal w* for the main wheel to track can be generated from the nose wheel as:

$$w^* = K^* w_n, \qquad (1)$$

where $w_n$ is the nose wheel angular rate and $K^*$ is a constant and given by:

$$K^* = \frac{R_n}{R}(1 - S^*).$$

where R is the radius of the main wheel and $R_n$ is the radius of the nose wheel. Accordingly, a desired tire slip value $S^*$ can be maintained and the maximum brake force is resulted when the main wheel tracks the desired angular velocity $w^*$ under the control of PLL scheme. In general, it is reasonable if $S^*$ is chosen from 0.1 to 0.2.

1.2 Tire Force Model

According to the tire model presented by Dugoff et al in a paper "An analysis of Tire Traction Properties and their Influence on Vehicle Dynamic Performance", SAE Paper No. 700377, 1970, the tire brake force $F_x$ can be described as follows:

$$F_x = \frac{C_s S}{1-S} \text{ when } \frac{C_s S}{1-S} < \frac{\mu F_z}{2} \quad (2)$$

or $$F_x = F_z\left[\mu - \mu^2 \frac{F_z(1-S)}{4 C_s S}\right] \text{when } \frac{C_s S}{1-S} \geq \frac{\mu F_z}{2}$$

The meanings of these symbols can be found in the nomenclature list at the end. S is the slip, which can be defined as:

$$S = 1 - R w/V,$$

where w is the angular velocity of the main wheel. While on the wet road $\mu$ can be given as:

$$\mu = \mu_0 (1 - A_s V S) \quad (3)$$

In the scheme, since the main wheel speed w rather than the slip S is used as the control variable, an approximated piecewise model of $F_x$ with respect to w is derived and used as:

$$F_x = F_0 + m_1 w \quad \text{when } w \leq w^* \quad (4)$$

or $$F_x = F_0 + m_1 w^* + m_2 (w - w^*) \quad \text{when } w < w^*$$

where $F_0$ is the brake force when the wheel is locked, $m_1$ and $m_2$ are slopes, and $w^*$ is the angular velocity at which the maximum brake force occurs. That is, at a given aircraft speed V, the tire force $F_x$ and the angular velocity w of the main wheel have a one-to-one correspondence and $F_x$ will be maximum when $w = w^*$. Furthermore, the associated parameters in Eq. (4) can be estimated from the following Dugoff tire model:

$$F_0 = \frac{F_x}{S} \cdot \frac{S}{w}\bigg|_{S=1} = F_z \mu_0 (1 - A_s V) \quad (5)$$

$$m_1 = \frac{F_x}{w}\bigg|_{w=0} = \frac{F_x}{S} \cdot \frac{S}{w}\bigg|_{S=1} = F_z \mu_0 A_s R \quad (6)$$

$$w^* = 0.9 \, V/R \quad (7)$$

-continued $$m_2 = \frac{F_0 + m_1 w^*}{w^* - V/R} \quad (8)$$

Figure 5:
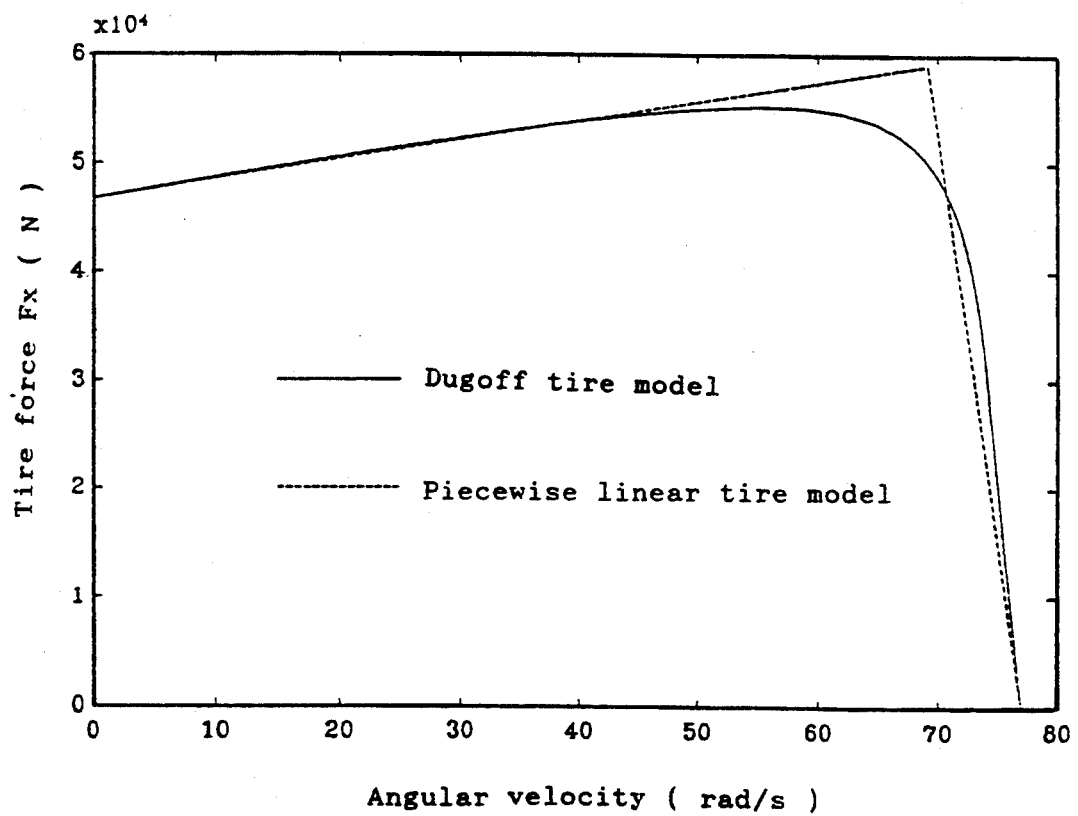
FIG. 5 is a graph, showing the nonlinear and piecewise linear tire force models.
Figure 6:
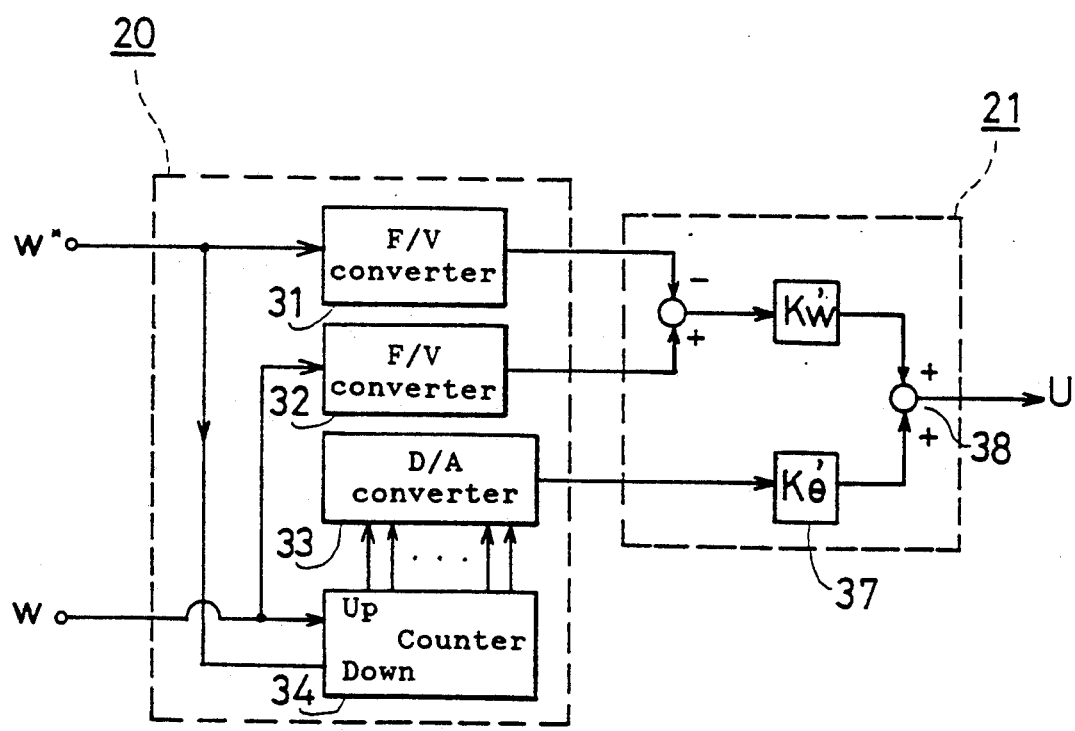
FIG. 6 is a circuit block diagram, showing a phase detector and a controller designed for ABS.

It is obvious that the slope $m_1$ is positive, the slope $m_2$ is negative, and $|m_1| \ll |m_2|$. Referring to FIG. 5, the curves thereof represent both the Dugoff tire model and the piecewise linear model. As can be seen from the graph, the piecewise linear tire model is quite acceptable.

1.3 Phase detector

The concept of the phase-locked loop is used to track the phase and the frequency of a reference signal. The characteristics of the phase detector have a great effect on the dynamic performance of the PLL system. In general, the phase-locked loop has three distinct states, namely a free-running state, a capture state, and a phase-locked state. Initially, the VCO is free-running. After an error voltage forces the frequency of the VCO output to change in a direction to reduce the frequency difference between the input signal and the VCO output, the loop is in the capture state. This process continues until the frequency of the VCO output and the frequency of the input signal are exactly the same. At this point, the loop is phase-locked. For different VCO's the corresponding phase detector must be properly chosen and designed.

In applying the concept of PLL on ABS, a special phase detector rather than the conventional phase detectors described in "Phase-Locked Loops—Theory, Design, and Applications" by R. E. Best published by Mcgraw-Hill, New York 1984, is used. When the aircraft is braked, the frequency difference between $w^*$ and w may be very large and the free-running state exists. An Exclusive-OR phase detector can not be used since it is not capable of generating the phase error signal when the frequency difference is large. An edge-triggered JK flip-flop phase detector is also not suitable since it is not capable of generating the frequency error signal when the frequency difference is small. For a detector defined as type 4 by Best, although it is capable of providing the phase error signal and the frequency error signal concurrently for some limited frequency ranges, its nonlinear characteristics, however, complicate the analyses and thus it will not be utilized here.

Therefore, a special phase detector similar to the one suggested by D. F. Geiger in his publication "Phase-lock Loops for DC Motor Speed Control" Port Washington, N.Y. 1981, will be used here as shown in FIG. 4 which includes an up-down counter 34, a D/A (digital to analog) converter 33 and a pair of F/V (frequency to voltage) converters 31, 32. Each of the F/V converters 31, 32 produces an output voltage which is proportional to the frequency of its input signal. The up-down counter 34 has a counter register. A leading edge in the waveform of w will add 1 to the counter register of the up-down counter 34, and a leading edge in the waveform of $w^*$ will subtract 1 therefrom. The counter register of the up-down counter 34 is connected via a parallel data bus to the D/A converter 33 which is capable of producing accordingly an analog output voltage and the magnitude of the output voltage is directly proportional to the binary value stored in the counter register. If the counter register of the up-down counter 34 is empty, the output voltage of the D/A converter 33 is zero. While if the counter register is full (all digits are 1), the output voltage is at the maximum value. In fact, the output voltage is proportional to the time integral of the frequency error and is thus defined here as a phase error $\Theta e$ which has the characteristics of $$\Theta_e = w - w^*. \tag{9}$$

Due to the overflow and underflow characteristics of the up-down counter 34, the range of the phase error $\Theta_e$ will be defined to be limited or confined in the range from 0 to $2\pi$ in this scheme. So when $\Theta_e$ is out of the range from 0 to $2\pi$, it will be transformed back to be within this range by taking its modulus of $2\pi$.

In addition, it will be noticed that the output signal w is fed back positively into the phase detector 20 since it causes the phase error to increase, while the reference signal $w^*$ is fed forwards negatively. This is different from the conventional way of feedback, and a detailed analysis will be given later in the description.

1.4 Control Law

A simple proportional control algorithm is used as $$U = K_\Theta'^* \Theta_e + K_w'^*(w - w^*), \tag{10}$$

where $K_\Theta'$ and $K_w'$ are the control gains and which are constant. This equation tells that the servovalve input current U is proportional to both the phase error and the frequency error. In fact, this control scheme for the PLL controlled ABS is similar to the PI (proportional and integral) control algorithm with slip control. Since the wheel speed S, defined previously as $S = 1 - Rw/V$, has one-to-one correspondence to the wheel speed for a given aircraft speed. And the phase error can be regarded as the integration of frequency error, an algorithm like the PI control of the wheel speed w, or equivalently, the slip S, is actually used. The difference is only on that $\Theta_e$ is restricted to a limited range and with the modulus of $2\pi$ due to the underflow and overflow characteristics of the phase detector 20.

1.5 Hydraulic Servovalve

It is assumed that the response of the pressure control servovalve 22 is fast enough compared with the response of the brake wheel such that its dynamics can be neglected. And the hydraulic pressure P is proportional to the input current U by a positive factor $K_s$ as:

$$P = K_s * U \tag{11}$$

1.6 Brake Mechanism

The brake mechanism provides the brake torque due to the hydraulic pressure acting on the brake lining. The hysteresis and time delay between the brake mechanism is neglected in this study. And a linear relation between the brake torque $T_b$ and the P is assumed as:

$$T_b = Kb * P \tag{12}$$

where $K_b$ is a positive constant.

Note that $T_b$ must be non-negative, since the wheel will not turn backward. Combining the above equations, a function $G(\Theta_e, w)$ is obtained as:

$$G(\Theta_e, w) = K_\Theta * \Theta_e + K_w*(w - w^*) \tag{13}$$

where $K_\Theta$ is the phase control gain and is equaled to $K_b K_s K_\Theta'$, and $K_w$ is the frequency control gain and is equaled to $K_b K_s K'$. The brake torque $T_b$ then can be determined as:

$$Tb = \begin{cases} G(\Theta_e, w), & \text{for } G(\Theta_e, w) > 0, \\ 0, & \text{for } G(\Theta_e, w) < 0; \end{cases} \tag{14}$$

and this equation tells that the brake torque is a function of the phase error and the angular velocity of the wheel.

1.7 Wheel Dynamics

In the study of the PLL control system, the wheel dynamics is modelled without considering the suspension effect as:

$$I\dot{w} = F_x R - T_b \tag{15}$$

where I is the moment of inertia of wheel.

1.8 System Dynamics

Assume that the ABS dynamics is fast enough such that the velocity of the aircraft can be considered as a constant which is slow varying compared with the brake dynamics. The dynamical equations of the PLL controlled ABS can be obtained from the above equations (9), (14), and (15) as follows:

$$\begin{aligned} \Theta_e &= w - w^* \\ I\dot{w} &= F_x R - Tb \\ Tb &= G(\Theta_e, w,) \quad \text{for } G(\Theta_e, w) > 0, \\ &\quad 0, \quad \text{for } G(\Theta_e, w) < 0. \end{aligned} \tag{16}$$

The parameter values of ABS dynamics, used in the numerical computations and simulations, are listed in TABLE 1 below. Based on the parameters, the value of $S^*$ is chosen to be 0.1.

TABLE 1

| Parameter values of ABS | |
| --- | --- |
| Parameter | Value |
| Mass of aircraft, M | 7636.9 Kg |
| Rolling radius of wheel, R | 0.325 m |
| Moment of inertia of wheel, I | 3.42 Kg-m$^2$ |
| Friction Reduction Factor, $A_s$ | 0.01 s/m |
| tire Longitudinal Stiffness, $C_s$ | 778610 N |
| Static Friction Coefficient, $\mu_0$ | 0.8 |
| Velocity of Aircraft, V | 25 m/s |
| Slip Yielding Maximum Brake Force, $S^*$ | 0.1 |
| Brake force of Locked Wheel, $F_0$ | 46717 N |

2. Dynamic Analysis of PLL Controlled ABS

The dynamics of the PLL controlled ABS will be analyzed in $\Theta_e - w$ phase plane. The dynamical behaviors for different $K_\Theta$ and $K_w$ will be discussed together with the concept of bifurcation sets. Finally, some guidelines on choosing design parameters will be suggested.

2.1 $\Theta_e - w$ Phase Plane Analysis

For phase error $\Theta_e$ and angular velocity of wheel w taken as the state variables, the dynamic equations of the PLL controlled ABS can be obtained from equation (16) and listed in TABLE 2 below. Therefore, the dynamics of the system can analyzed in $\Theta_e - w$ phase plane.

TABLE 2

Dynamic Equations of PLL Controlled ABS

| Ranges of $w, \Theta_e$ | Dynamic Equations |
|---|---|

Upper Part

$w > w^*$ $\Theta_e = w - w^*$ $0 \leq \Theta_e < 2\pi$ $$\dot{w} = \begin{cases} \dfrac{m_2 R - K_w}{I} w - \dfrac{K_\Theta}{I} \Theta_e + \dfrac{F_0 R - (m_1 R - m_2 R + K_w)w^*}{I} & \text{for } G > 0 \\[2mm] \dfrac{m_2 R}{I} w + \dfrac{F_0 R + (m_1 R - m_2 R)w^*}{I} & \text{for } G \leq 0 \end{cases}$$

Lower Part

$w \leq w^*$ $\Theta_e = w - w^*$ $0 \leq \Theta_e < 2\pi$ $$\dot{w} = \begin{cases} \dfrac{m_1 R - K_w}{I} w - \dfrac{K_\Theta}{I} \Theta_e + \dfrac{F_0 R + K_w w^*}{I} & \text{for } G > 0 \\[2mm] \dfrac{m_1 R}{I} w + \dfrac{F_0 R}{I} & \text{for } G \leq 0 \end{cases}$$

Note: $K_\Theta = K_b K_s K_\Theta'$, $K_w = K_b K_s K_w'$, and $G = K_\Theta \Theta_e + K_w(w - w^*)$.

Figure 7:
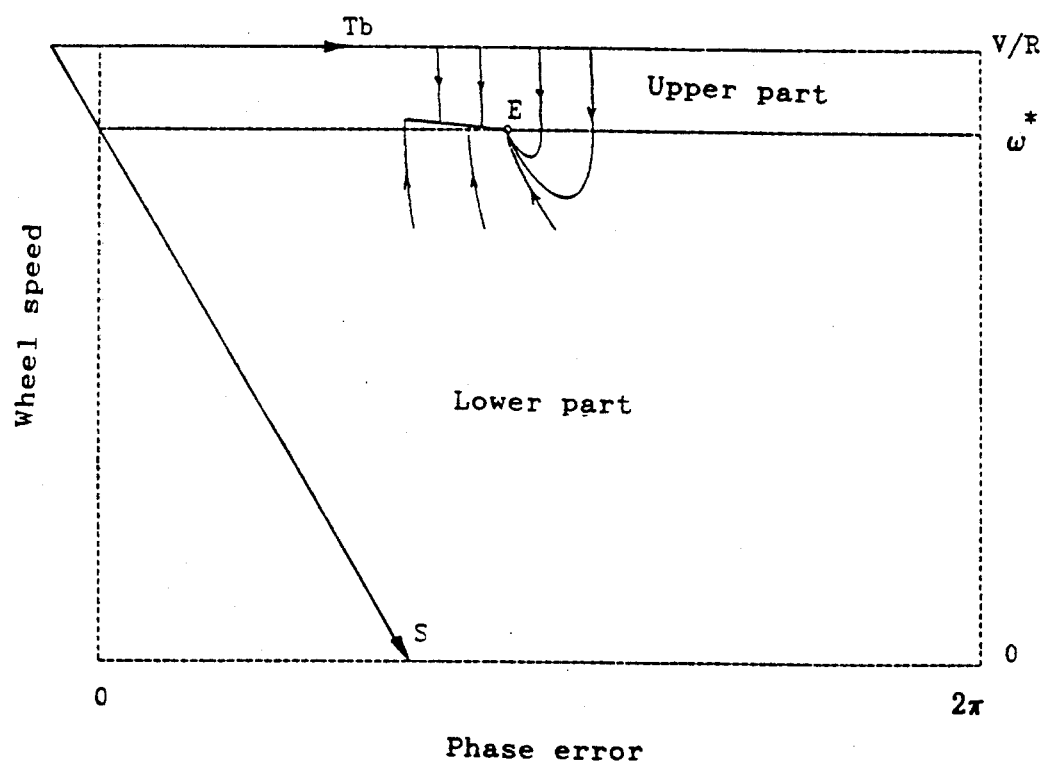
FIG. 7 is a qualitative drawing, showing the phase portrait for PLL controlled ABS.

Due to the piecewise linearity of the tire force model, the whole system is divided into two parts and each of which is linear and has different characteristics as shown in FIG. 7 with the two parts defined as:

(1) lower part:(the wheel speed slower than the reference signal) $0 \leq \Theta_e < 2\pi$, and $0 \leq w < w^*$;

(2) upper part:(the wheel speed faster than the reference signal) $0 \leq \Theta_e < 2\pi$, and $w^* \leq w < V/R$.

The angular velocity of wheel w is at the maximum value when the wheel is free rolling, i.e. $w = V/R$, and at the minimum when the wheel is locked, i.e. $w = 0$.

The equilibrium points of the ABS are found from the equations in TABLE 2 and listed in TABLE 3 for each part.

exist within the restricted range of $2\pi$ of the phase error. Otherwise there is no equilibrium point since E locates out of the restricted range and, therefore, it is impossible for the wheel speed of the ABS to track the reference signal $w^*$ and the maximum brake force will not be obtained.

Due to the piecewise linear characteristics of the tire model, the eigenvalues of the equilibrium point are different for the two parts as listed in TABLE 3, and they are dependent on both control gains $K_\Theta$ and $K_w$. The state trajectories of the PLL controlled ABS can be determined by combining the dynamic behavior of each part as shown in FIG. 7. Consequently, the eigenstructure of each part plays an important role on the

TABLE 3

Equilibrium Points and Eigenvalues

| Ranges of w | Equilibrium Points and Eigenvalues |
|---|---|

Upper Part

$w > w^*$ $w = w^*$ $\Theta_e = \dfrac{1}{K_\Theta}(m_1 R w^* + F_0 R)$ $$\lambda = \begin{cases} \dfrac{(m_2 R - K_w) \pm [(m_2 R - K_w)^2 - 4K_\Theta I]^{\frac{1}{2}}}{2I} & \text{for } G > 0 \\[2mm] 0, \dfrac{m_2 R}{I} & \text{for } G \leq 0 \end{cases}$$

Lower Part

$w \leq w^*$ $w = w^*$ $\Theta_e = \dfrac{1}{K_\Theta}(m_1 R w^* + F_0 R)$ $$\lambda = \begin{cases} \dfrac{(m_1 R - K_w) \pm [(m_1 R - K_w)^2 - 4K_\Theta I]^{\frac{1}{2}}}{2I} & \text{for } G > 0 \\[2mm] 0, \dfrac{m_1 R}{I} & \text{for } G \leq 0 \end{cases}$$

Actually there is only one equilibrium point E on the $w = w^*$ axis since it is shared by both parts as shown in FIG. 7. While the existence of the equilibrium point depends only on the value of the value of the control gain $K_\Theta$ for the phase error, only when $K_\Theta > (F_0 R + m_1 R w^*)/2\pi$, the equilibrium point can ABS dynamics. From the equation (9), since the phase error is decreasing for $w < w^*$ the state trajectories in the lower part in the phase plane will tend to the left; while in the upper part they will tend to the right. By the analysis method of isocline, the slope of the trajectory in the $\Theta_e - w$ plane can be obtained, from Eq. (16), as:

$$\frac{dw}{d\Theta_e} = \frac{RF_x - T_b}{I(w - w^*)}$$

and this equation tells that the state trajectories pass through the $w = w^*$ axis vertically.

Figure 8:
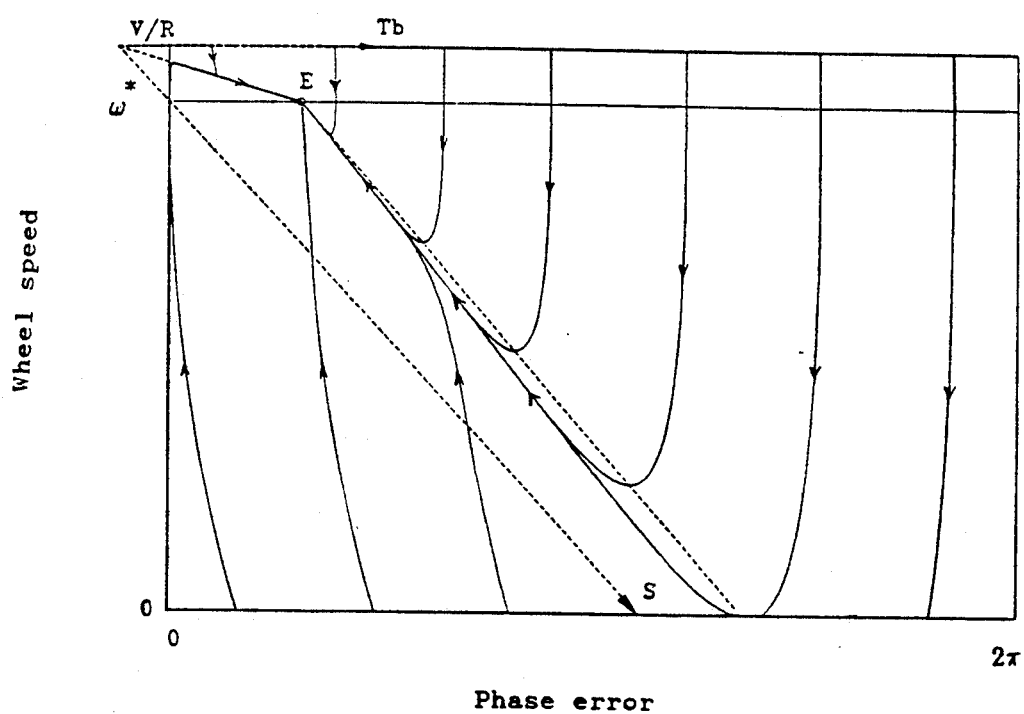
FIG. 8 is a graphical representation, showing the typical phase portraits of ABS.

The phase portraits of a typical example of the ABS with $K_\Theta = 20,000$ and $K_w = 1,000$ is shown in FIG. 8. The equilibrium point E behaves as a stable node in both parts, while the slopes of the asymptotic lines in each part are different. All the state trajectories will converge to the equilibrium point E to yield the maximum brake force.

2.2 $T_b$-phase Plane Analysis

Since it was mentioned previously that the PLL control scheme of ABS is somewhat equivalent to the PI control algorithm for a slip-controlled ABS. It is interesting to see how to read the changing behavior of the slip S and the brake torque $T_b$ in the $\Theta_e - w$ phase plane.

Transform the $(\Theta_e, w)$ coordinate to $(T_b, S)$ coordinate, we have:

$$\begin{bmatrix} T_b \\ S \end{bmatrix} = \begin{bmatrix} K_\Theta & K_w \\ 0 & -R/V \end{bmatrix} \begin{bmatrix} \Theta_e \\ w \end{bmatrix} + \begin{bmatrix} -K_w w^* \\ 1 \end{bmatrix} \quad (17)$$

The transformation matrix is not diagonal and it depends on $K_\Theta$ and $K_w$. Therefore, the $T_b - S$ coordinate system is not orthogonal when plotted on the $\Theta_e - w$ plane, as illustrated in FIG. 7. The axes of $T_b$ and S can be determined by the equations below:

$$T_b = 0 : w = w^* - \frac{K_\Theta}{K_w} \Theta_e \quad (18)$$

$$S = 0 : w = V/R \quad (19)$$

It is helpful to know that the axis of S will pass the point $(0,w)$ for whatever values of $K_\Theta$ and $K_w$ and its slope depends on the ratio of $K_\Theta / K_w$. While the axis of $T_b$ locates on the upper boundary of w with its direction determined by the sign of $K_\Theta$. If $K_\Theta$ is positive, the $T_b$ axis points to the right; whereas if K is negative the $T_b$ axis points to the left. Those points which locate in the negative direction of $T_b$ in FIG. 7 correspond to the situation that the brake pressure is released to result in no brake torque.

From the equation (15), it can be known that w equals to zero when $T_b = RF_x$. Therefore, any state trajectories will pass through the curve $RF_x$ horizontally. Hence, the $RF_x$ curve can be obtained by connecting those points at which the trajectories move horizontally as shown by dashed line in FIG. 8. It also can be known that $RF_x$ is piecewise linear and has a peak at $w = w^*$ which is actually the equilibrium point E. Henceforth, the goal of control is to make all the state trajectories tend to E to obtain the maximum brake force.

There exists one important property that the wheel speed w decreases when the applied brake torque is above the $RF_x$ curve, and the wheel speed w increases otherwise. This tendency can be easily seen in the example shown in FIG. 8. It is also noticed that the tendency of the trajectory changes when passing through the axis of $T_b = 0$ due to the switching of Eq. (14) as mentioned in the foregoing description.

2.3 Dynamics of PLL Controlled ABS under Different Control Gains

In order to analyze the ABS dynamics, the concept of the bifurcation set is introduced at first. The bifurcation set defined for the continuous system by J. Guckenheimer and P. Holmes in their publication of "Nonlinear Oscillations, Dynamical Systems, and Bifurcations of Vector Fields" (1985), is a set in parameter space on which the system becomes structurally unstable to qualitative behaviors of the system changes abruptly. And between these bifurcation sets the system is robust. The term of the bifurcation set is still used for the piecewise linear system when the equilibrium point disappears or a limit cycle occurs, though the bifurcation phenomenon may not be the same as those of the continuous system as will be explained later.

Figure 9:
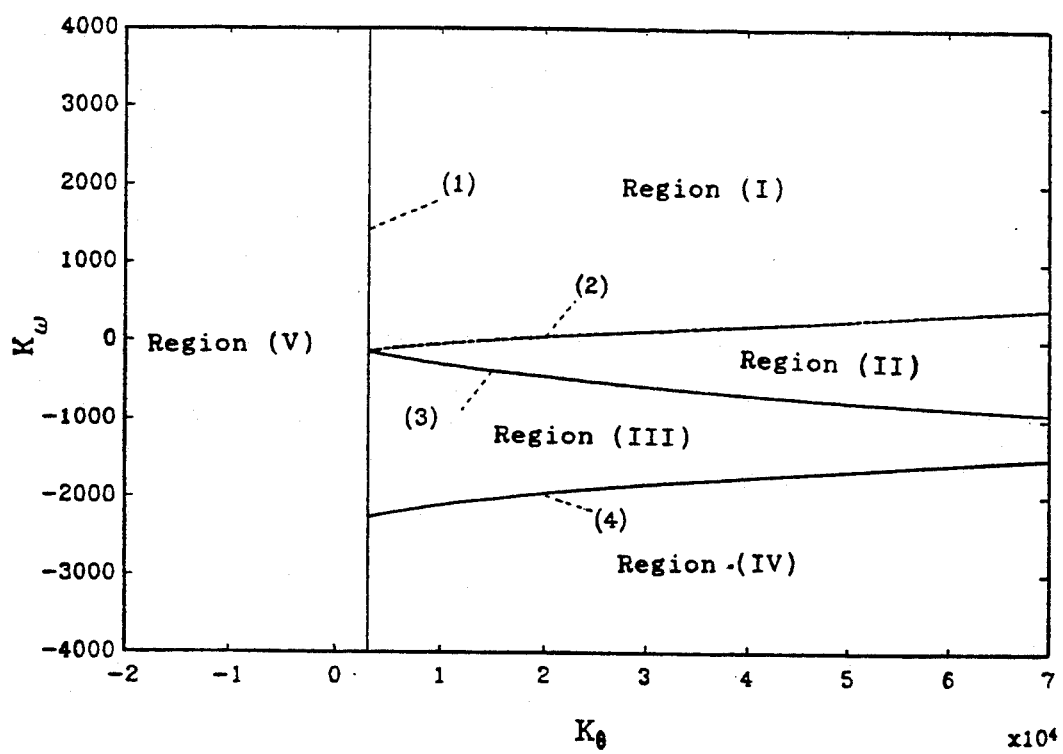
FIG. 9 is a graphical representation, showing the bifurcation sets of PLL controlled ABS.

According to the locations and the stabilities of the equilibrium point, the bifurcation sets can be found as follows:

(1) $K_\Theta = (F_0 R + m_1 R W^*)/2\pi$, (2) $K_{wc} = f(K_{\Theta c})$ (3) $K_w = m_1 R - 2K_\Theta I$ (4) $K_w = m_2 R + 2K_\Theta I$ The $K_\Theta - K_w$ plane can be divided into five regions by these bifurcation sets as shown in FIG. 9 with those curves which represent the bifurcation sets. The dynamic behaviors of each region and the reasons of forming these bifurcation sets will be explained in detail below.

For the control gains within region (I), all the state trajectories will converge to the equilibrium point E to yield the maximum brake force. The phase portrait with $K_\Theta = 20,000$ and $K_w = 1,000$ is shown in FIG. 8 for the example as mentioned previously. Since the corresponding equilibrium point E in the lower part of the phase may behave as a focus or a stable node and a stable node in the upper part for region (I), the convergence to the equilibrium point is guaranteed. While E may shift to the right as K is decreasing and, when $K_\Theta > (F_o R + m_1 R w^*)/2$, E will be out of the restricted range. When this happens, the bifurcation set (1) is thus determined. In other words, if the control gains are chosen in region (V) the equilibrium point will disappear from the range of 0 to $2\Theta$ of $\Theta_e$.

Figure 10A:
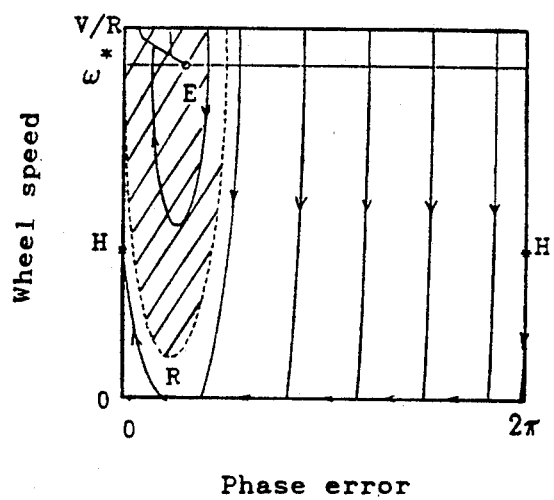
FIGS. 10A-10B are two graphical representations, showing respectively the phase portraits of ABS for two different regions.

From region (I) to region (II), there will exist a so called region of attraction of the equilibrium point E as indicated by the shaded area in FIG. 10A. Only those trajectories whose initial conditions locate inside this region will converge to E. This is because that though E may behave as a stable or an unstable focus for the lower part in the $\Theta_e - w$ plane, e is always a stable node in the upper part. Once the state trajectories enters the lower part of the phase plane, it will eventually oscillate into the upper part and converge to the equilibrium point E.

For the initial conditions outside of the region of attraction, the trajectories will tend to a limit cycle, for which the wheel is locked for most of the time, as represented by the curve from the point H at the right to H at the left in FIG. 10A since the point leaving the left boundary will enter the phase plane at the right boundary. The time response of the wheel speed for this limit cycle can be seen in FIG. 11 and the reason of forming it will be explained below. Returning to FIG. 10A, the trajectory reaching w=0 will slide along the axis w=0 until reaching a point R, termed a rising point, at which the slope of the trajectory is tangent to the axis w=0. Therefore, all the trajectories reaching w=0 will leave it at the point R. This is because that the changing rate of wheel speed starts to be positive at this point and the wheel speed will increase from being locked. Furthermore, it can be found that the rising point is unique for the control gains chosen in region (II) since the dynamics in the lower part of the $\Theta_e - w$ plane is linear and E is a focus. Those trajectories leaving from the rising point R will finally hit the left boundary $\Theta hd\ e=0$ at a point H, which is termed a hitting point. If the hitting point H is lower than the point $(0,w^*)$, a limit cycle occurs since those trajectories leaving the left boundary below H will reenter the phase plane from the right boundary and finally reach the axis w=0. Thus they will never converge to E as illustrated in FIG. 10A. If the hitting point H is higher than the point $(0,w^*)$, then all the trajectories may eventually enter the upper part of the phase plane and converge to the equilibrium point E. The bifurcation set (2) is thus found when the hitting point H coincides the point $(0,w^*)$. Furthermore, the region of attraction of the equilibrium point E may shrink for large value of $K_\Theta$.

For the control gains changed from region (II) to region (III), the equilibrium point E on the lower part of $\Theta_e - w$ plane changes from an unstable focus to an unstable node, which results in bifurcation set (3). Though the trajectories whose initial conditions locate inside the region of attraction as indicated by shaded area in FIG. 10B, will converge asymptotically to E which is still a stable node for the upper part, a little perturbation will make them deviate from E. Therefore, the system becomes weakly robust. Once the trajectory enters the lower part, it will reach the axis w=0 and slide along it and the wheel is locked afterwards.

For the control gains in region (IV), the wheel is locked all the time. Since the equilibrium point E of the upper part may become a focus or even an unstable node, the region of attraction of E hence disappears. FIG. 10A) shows that all the state trajectories will reach w=0 and slide along it as a limit cycle of locked wheel. The reason of forming the bifurcation set (4) is when E in the upper part changes from a stable node to a focus.

Figure 10B:
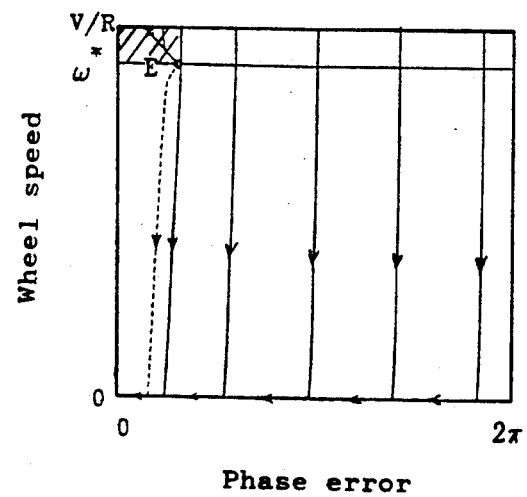
Figure 11:
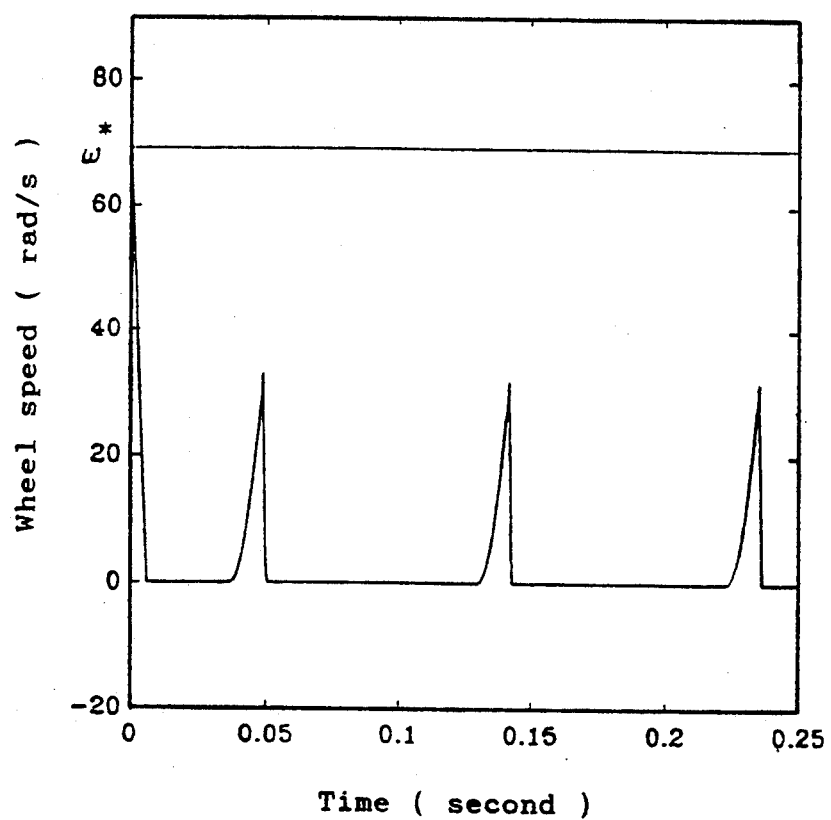
FIG. 11 is graph, showing the time response of the main wheel speed.
Figure 12A:
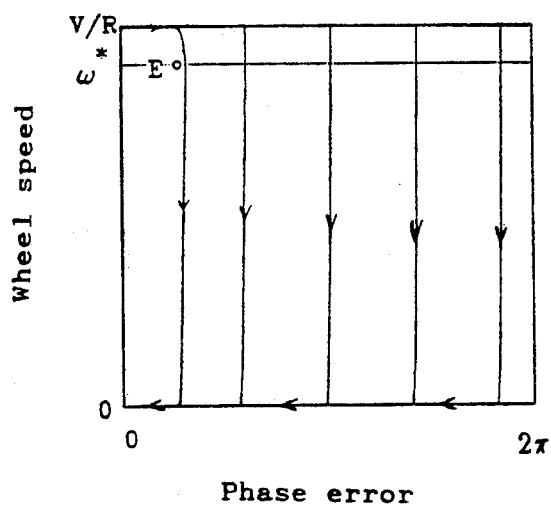
FIGS. 12A-12B are two graphical representation, showing the phase portraits of ABS for two different regions.
Figure 12B:
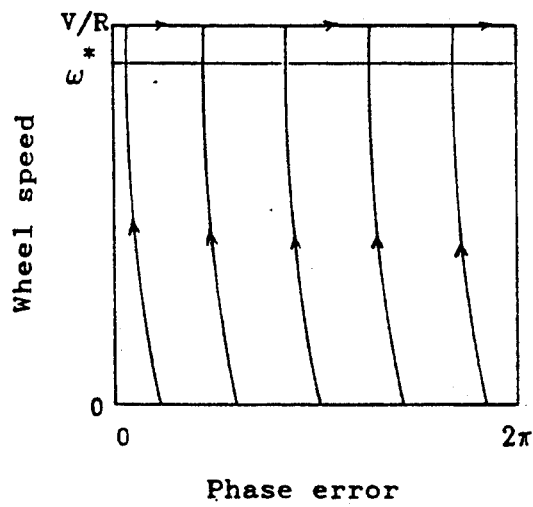

Finally, for the control gains in region (V), the system will have the danger of loss of brake effort. This is because that the equilibrium point E locate outside of the defined range 0 to $2\pi$ of $\Theta_e$. FIG. 10B shows that all the state trajectories entering the upper part will reach the axis w=V/R and slide along it, a new limit cycle with w=V/R thus occurs, for which the wheel is rolling freely. Those trajectories sliding along the axis w=V/R tend to the right since the phase error will increase in the upper part of the $\Theta_e - w$ plane as mentioned previously. Therefore, the brake effort is lost. Though the eigen-structures of both parts change for different $K_\Theta$ and $K_w$, ABS is regarded to fail since the stable convergence is impossible and the maximum brake force is not obtained.

Through the demonstrations above the influence of the control gains $K_\Theta$ and $K_w$ are chosen properly. Normally the control gains should be properly chosen from region (I). However, it is usually to start braking when the wheel is still rolling freely and the phase error is set to be zero as the aircraft lands on the runway. In this case, those control gains $K_\Theta$ and $K_w$ in region (II) can also be used in addition to region (I) since there exists a region of attraction of the equilibrium point.

In summary, some guidelines are made for choosing the control gains. The guidelines includes:

(1) The ideal choices on the control gains $K_\Theta$ and $K_w$ to obtain the maximum brake force are in region (I) for all cases;

(2) When the control gains in region (I) are close to the bifurcation sets between other regions, the qualitative behavior of the system is starting to change and the robustness of the system is degraded;

(3) The control gains in region (III), and (IV) always cause the wheel-locking condition;

(4) The control gains in region (V) are forbidden;

(5) The choice of $K_\Theta$ can be used to determine the location of the equilibrium point, and it is an important factor for design if the limitation of the brake torque is considered.

Figure 13:
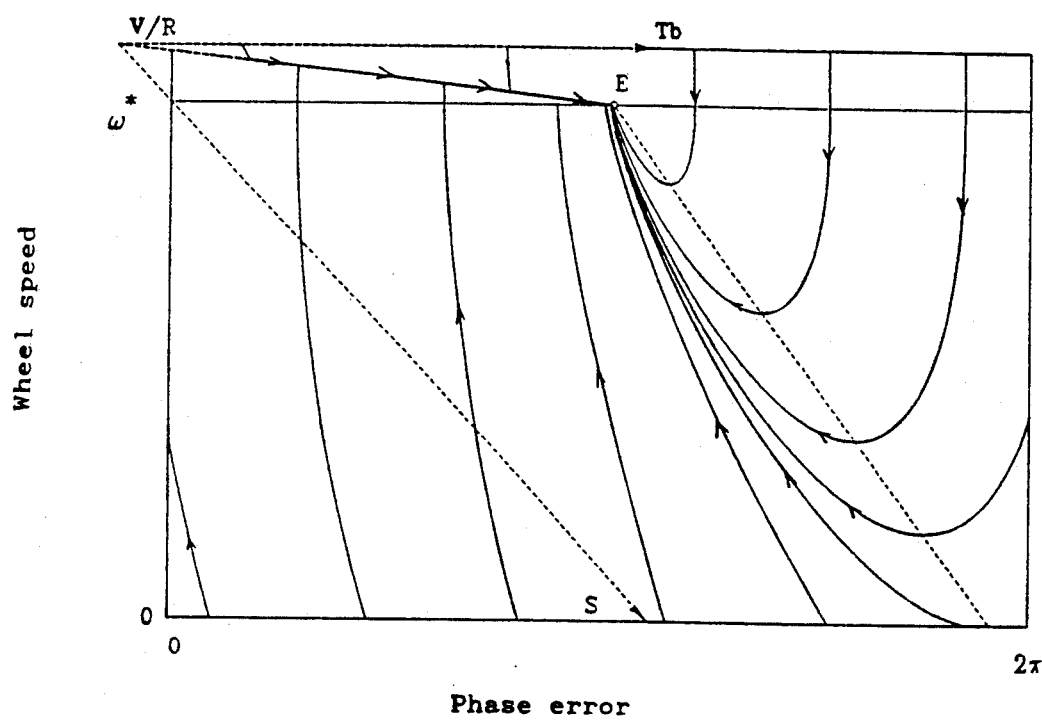
FIG. 13 is a graphical representation, showing another typical phase portraits of ABS.

For example, FIG. 13 shows the phase portraits with $K_\Theta = 6,000$, and $K_w = 300$ which are chosen from region (I) and can compared with those in FIG. 8 with the equilibrium point E sitting at the center of the phase plane. It indicates that the brake mechanism need not be designed as powerful as the case in FIG. 8 since the maximum $T_b$ that occurs for $\Theta_e = 2\pi$ is about $2RF_x$ and is much less than that shown in FIG. 8.

3. ABS Dynamics with Conventional PLL Control Scheme

The applicability of the PLL control scheme on ABS in a conventional feedback structure will be discussed herein. The reason that this well-known technique can not be directly applied on ABS will be explained. The concept of the pressure bias is then introduced to modify the PLL control strategy to make it practical.

3.1 Control Scheme of ABS with the Conventional PLL Concept

It has been mentioned that in the PLL system the output frequency of the VCO is fed back to the phase detector to be compared with the reference signal. In general, for the conventional algorithm of PLL, the output frequency of VCO is referred to be feedback negatively and the reference one is fed forwards positively. This scheme was successfully used on the speed control of DC motor. In this section, it will be improved that this conventional way of feedback, due to the danger of loss of brake effort, can not be directly utilized for the PLL controlled ABS.

Figure 14:
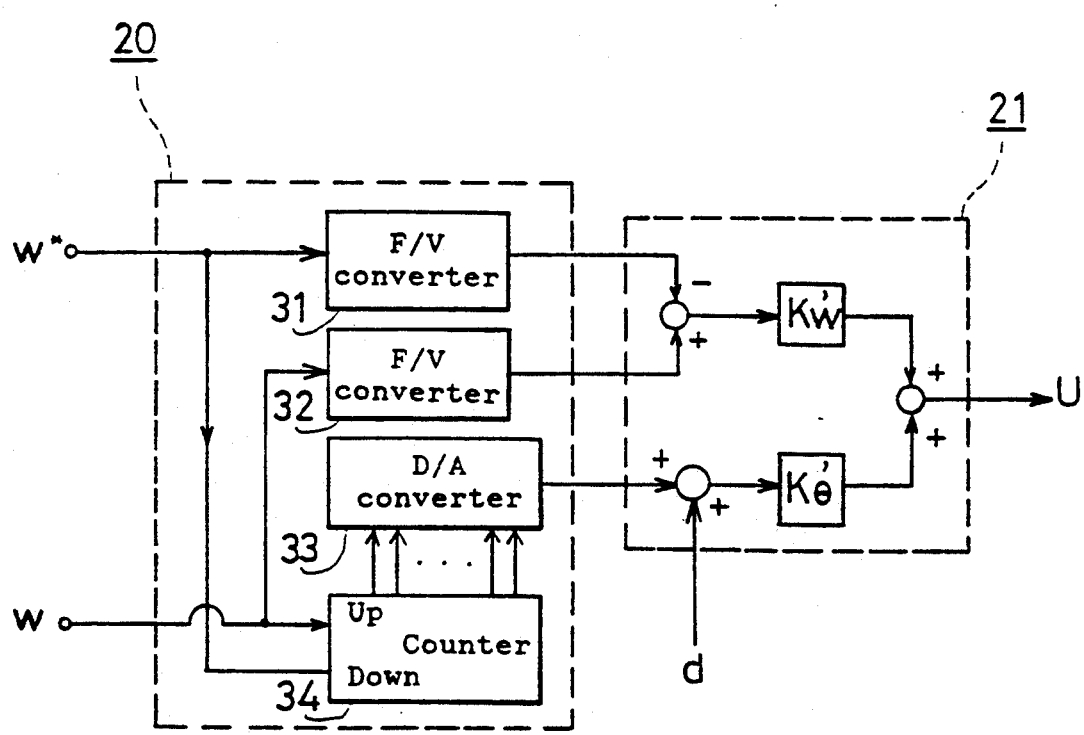
FIG. 14 is a circuit block diagram, showing a phase detector and a controller designed for ABS using conventional PLL algorithm.

The control scheme of the conventional PLL controlled ABS is shown with d=0 in FIG. 14. The basic structure of the brake system is unchanged except for the sign convention of the special phase detector and the controller. The major difference of the phase detector with the aforementioned one is that the leading edge of the reference signal $w^*$ triggers the adding of 1 to the counter register of the up-down counter 34, and the leading edge of the wheel speed w triggers the subtraction of 1 therefrom. It seems that the exchanged signs of w and $w^*$ can be compensated by the signs of the control gains and makes this control scheme of the conventional PLL still applicable to ABS. In fact, no matter how the control gains $K_\Theta$ and $K_w$ are chosen, this control scheme fails to track the reference signal and the reason will be explained below.

The phase error between $w^*$ and $w$ is given as:

$$\Theta_e = w^* - w, \quad (20)$$

and the range of this phase error is also restricted and treated as 0 to $2\pi$. While the controller is different from that of section 2 since the roles of $w^*$ and $w$ is exchanged and the control algorithm is:

$$U = K_\Theta' \Theta_e + K_w'(w^* - w). \quad (21)$$

Therefore, the function $G(\Theta_e, w)$ is redefined as:

$$G(\Theta_e, w) = K_s K_{73}' \Theta_e + K_s K_w'(w^* - w). \quad (22)$$

The system equations can be obtained, from equations (12), (15), (21), and (22), and listed in TABLE 4.

3.2 Nonlinear Analysis of ABS Dynamics

The locations of equilibrium point and the corresponding eigenvalues are derived from the system equations and listed in TABLE 5.

TABLE 5

| Equilibrium Points and Eigenvalues of ABS using Conventional PLL Algorithm | |
|---|---|
| Ranges of $w$ | Equilibrium Points and Eigenvalues |
| Upper Part | |
| $w > w^*$ | $w = w^*$ |
| | $\Theta_e = \frac{1}{K_\Theta}(m_1 R w^* + F_0 R)$ |
| | $\lambda = \begin{cases} \frac{(m_2 R + K_w) \pm [(m_2 R + K_w)^2 + 4K_\Theta I]^{-\frac{1}{2}}}{I} & \text{for } G > 0 \\ 0, \frac{m_2 R}{I} & \text{for } G \leq 0 \end{cases}$ |
| Lower Part | |
| $w \leq w^*$ | $w = w^*$ |
| | $\Theta_e = \frac{1}{K_\Theta}(m_1 R w^* + F_0 R)$ |
| | $\lambda = \begin{cases} \frac{(m_1 R + K_w) \pm [(m_1 R + w)^2 + 4K_\Theta I]^{-\frac{1}{2}}}{2I} & \text{for } G > 0 \\ 0, \frac{m_1 R}{I} & \text{for } G \leq 0 \end{cases}$ |

Figure 15:
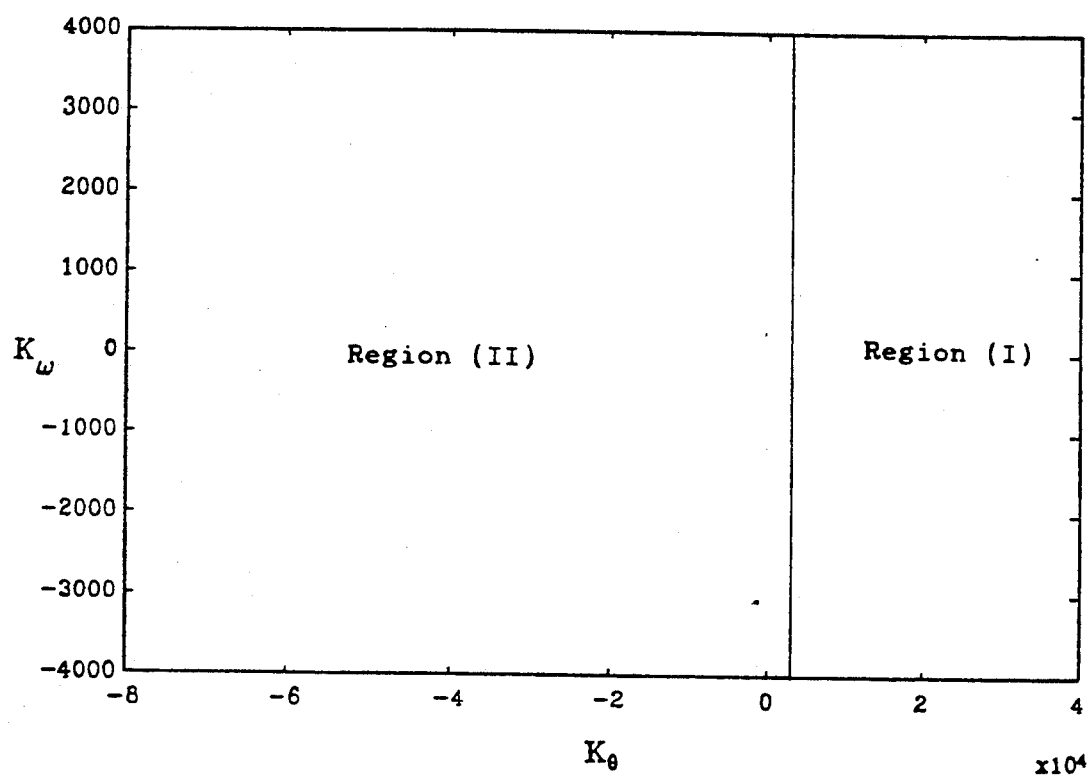
FIG. 15 is a graphical representation, showing the bifurcation set of ABS using conventional PLL algorithm.

Only one bifurcation set is found and its equation is:

$$K_\Theta = (F_0 R + m_1 R w^*)/2\pi, \quad (23)$$

and this corresponds to the situation when the equilibrium point disappearing from the restricted range of 0 to $2\pi$. Therefore, the parameter plane of $K_{73}$ and $K_w$ is partitioned into two regions by this bifurcation set as shown in FIG. 15. The corresponding dynamical behaviors for choosing the gains in each region will be described next.

Figure 16:
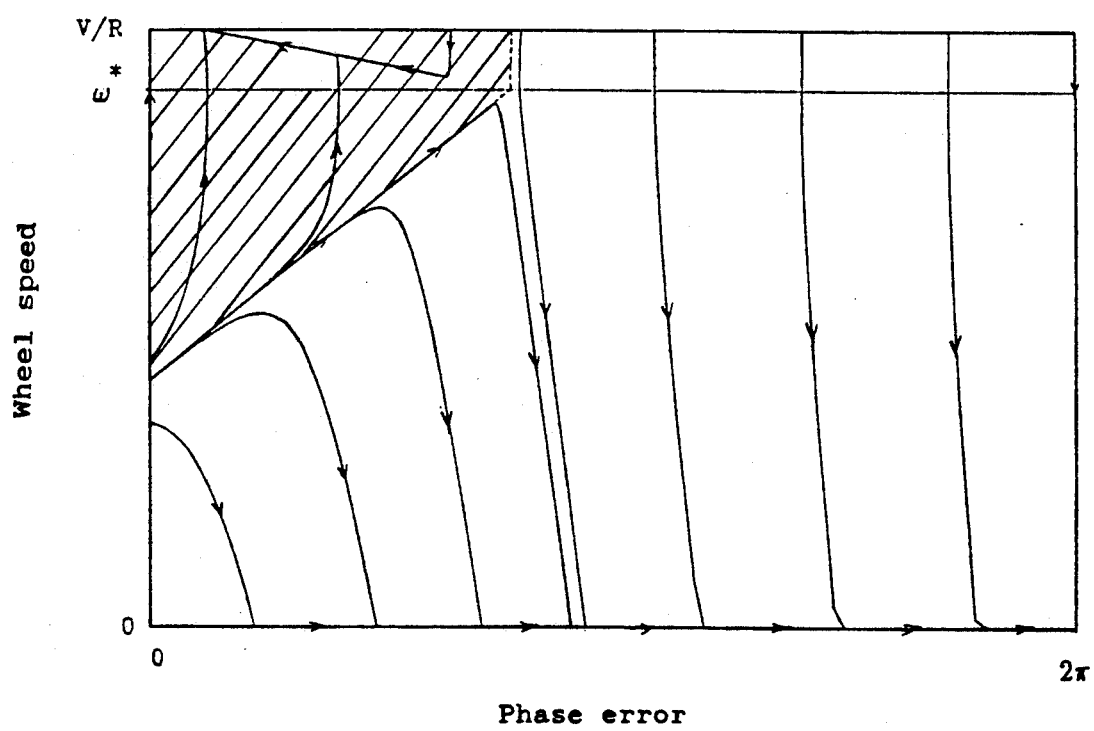
FIG. 16 is a graphical representation, showing the phase portraits of ABS for a region using conventional PLL algorithm.
Figure 17:
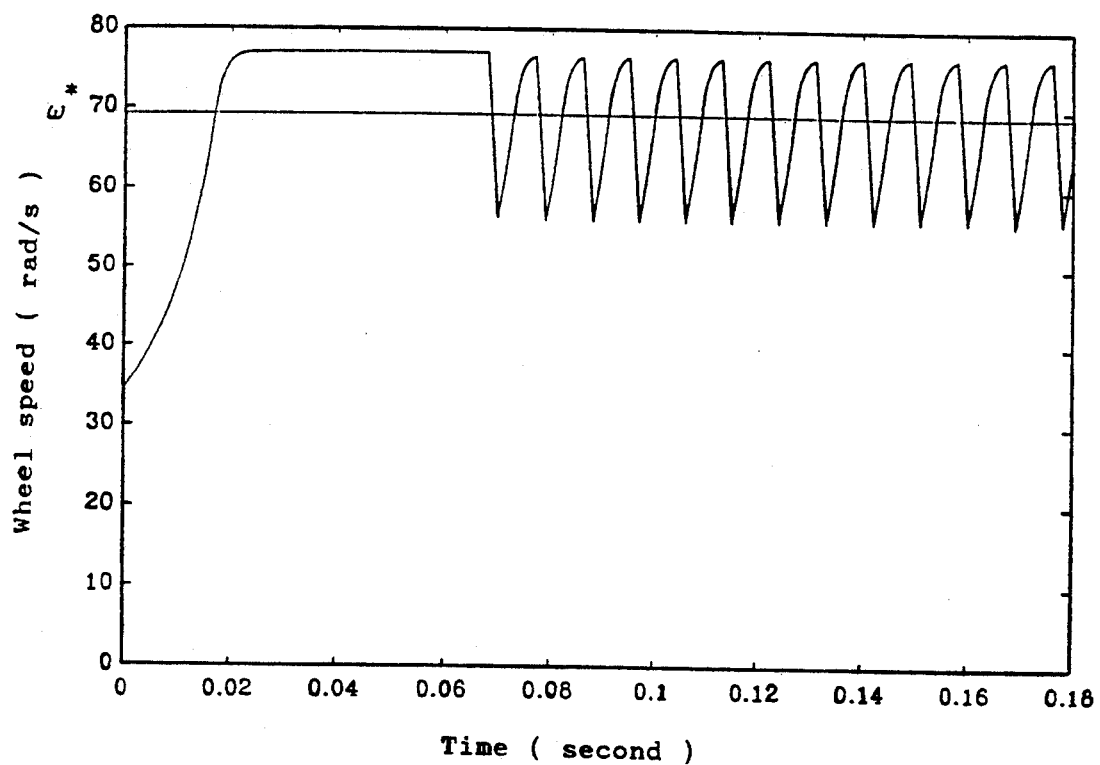
FIG. 17 is a graph, showing the time response of the main wheel speed.

For the control gains in region (I), the system dynamics will have two possibilities depending on the location of the initial condition as shown in FIG. 16. In this case, the equilibrium point E is a saddle for both parts are

TABLE 4

| Dynamic Equations of ABS using Conventional PIL Algorithm | |
|---|---|
| Ranges of $w, \Theta_e$ | Dynamic Equations |
| Upper Part | |
| $w > w^*$ | $\Theta_e = w - w^*$ |
| $0 \leq \Theta_e < 2\pi$ | $\dot{w} = \begin{cases} \frac{m_2 R + K_w}{I} w - \frac{K_\Theta}{I} \Theta_e + \frac{F_0 R + (m_1 R - m_2 R - K_w)w^*}{I} & \text{for } G > 0 \\ \frac{m_2 R}{I} w + \frac{F_0 R + (m_1 R - m_2 R)w^*}{I} & \text{for } G \leq 0 \end{cases}$ |
| Lower Part | |
| $w \leq w^*$ | $\Theta_e = w - w^*$ |
| $0 \leq \Theta_e < 2\pi$ | $\dot{w} = \begin{cases} \frac{m_1 R + K_w}{I} w - \frac{K_\Theta}{I} \Theta_e + \frac{F_0 R - K_w w^*}{I} & \text{for } G > 0 \\ \frac{m_1 R}{I} w + \frac{F_0 R}{I} & \text{for } G \leq 0 \end{cases}$ |

Note: $K_\Theta = K_b K_s K_\Theta'$, $K_w = K_b K_s K_w'$, and $G = K_\Theta \Theta_e + K_w(w - w^*)$.

different. For the initial conditions located inside the specified region which is restricted by the asymptotic lines with positive slope in both parts, shown by the shaded area in FIG. 16, the state trajectories will converge to a limit cycle whose center is at $(0, w^*)$. This limit cycle can be seen clearly from FIG. 17 which shows the time response of the wheel speed. It is obvious that the wheel speed will oscillate around $w^*$. While for the initial conditions located in other region the trajectories will converge to another limit cycle with $w = 0$. It means that the wheel is locked all the time and ABS fails. Furthermore, the shaded area in FIG. 16 will shrink as the larger $K_\Theta$ increases.

Figure 18:
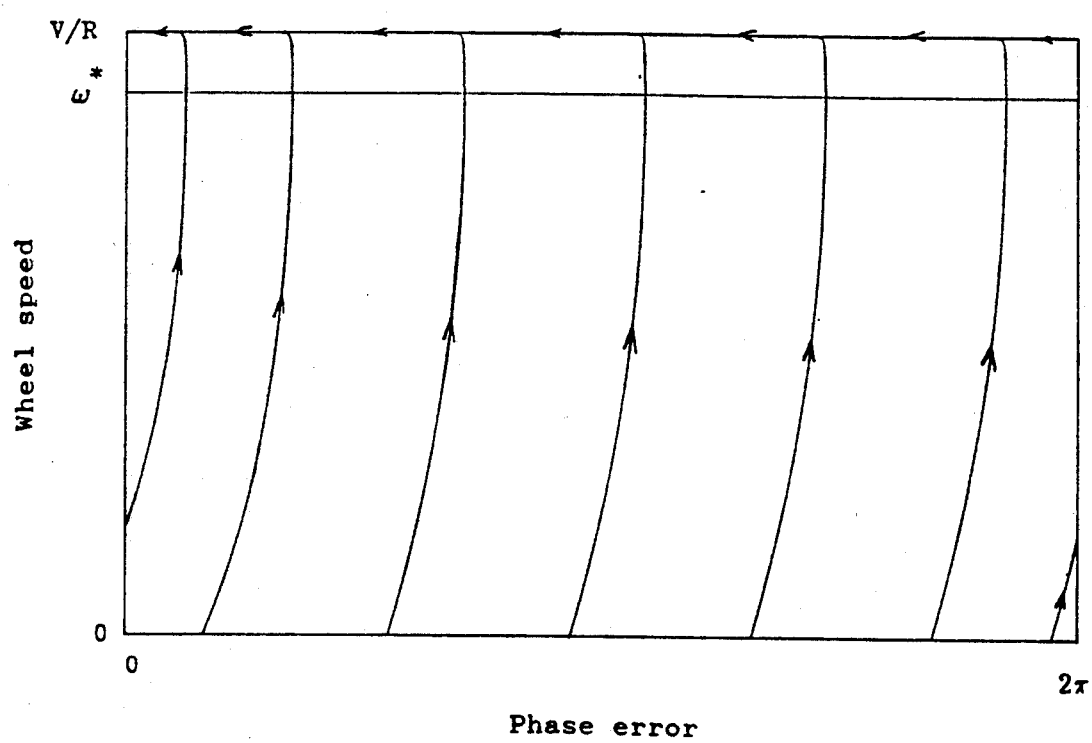
FIG. 18 is a graphical representation, showing the phase portraits of ABS for region (II) using conventional PLL algorithm.

While for the control gains in region (II), there exists the danger without braking effort. Since, in this time, the equilibrium point no longer stays inside the defined range of and the trajectories then converge to a limit cycle as shown in FIG. 18. This limit cycle behaves in the way that the wheel rolls freely most of the time. However, though the eigen-structures of both part in the phase plane may alter for different $K_\Theta$ and $K_w$, the global dynamics is unstable and it fails to obtain the maximum brake force.

The analysis presented above tells that this conventional control scheme of PLL can not be applied on ABS, since for whatever control gains the maximum brake force can not be obtained. Even more there may exist the danger without braking effort or the wheel-locking situation if the control gains are not selected properly. The failure of ABS under the conventional PLL control scheme is due to the minus sign from the brake torque $T_b$ to the wheel speed $w$ in Eq. (15). Therefore, if the wheel speed is fed back negatively, the whole system may have a positive feedback loop and, hence, stable convergence is impossible.

From the viewpoint of the brake torque $T_b$ in the $\Theta_e - w$ phase plane, the reasons of failure of this control algorithm can also be understood. The axis of $T_b = 0$ shown in the $\Theta_e - w$ plane is given as:

and it pass through the point $(0, w^*)$. If K is chosen to be positive, most of the defined ranges of and w can be controlled by the brake torque $T_b$ since $T_b$ is positive in most part of the phase plane. However, the corresponding eigen-structure of the system belongs to be saddle type and the system stability is lost. While for $K_\Theta < 0$, most of the trajectories travelling with zero brake torque, and therefore stable convergence is impossible.

In fact, this undesirable situation can be overcome if an additional bias voltage is input to the controller and this will be described below.

3.3 Effects of Pressure Bias d on ABS Dynamics

The main cause of failure is that the stable equilibrium point is out of the defined range of $\Theta_e$ and makes the stable convergence impossible. In fact, it is the underflow and overflow characteristics of the up-down counter 34 which make the stable equilibrium point disappear. A new concept of the pressure bias will be introduced herein to move the stable equilibrium point into the defined range so that ABS may work with the conventional PLL algorithm with negative feedback of w.

Based on the structure in previous section, the controller is modified, shown in FIG. 14, as:

$$U = K_\Theta'(\Theta_e + d) + K_w'(w^* - w) \quad (25).$$

A new input voltage d is added to modulate the input current of servovalve. The input voltage d can be regarded as the pressure bias since, combining equation (11), and (24), the output hydraulic pressure of the servovalve is:

$$P = K_s K_\Theta'(\Theta_e + d) + K_s K_w'(w^* - w) \quad (26)$$

and the added term can regulate the hydraulic pressure by the amount of $K_s K_\Theta' d$.

The dynamic equations of the system are the same as those in last section in last section except for an adding term in $T_b$ as listed in TABLE 6.

TABLE 6

Dynamic Equations of ABS using conventional PLL Algorithm with Pressure Bias d

Ranges of $w, \Theta_e$    Dynamic Equations

Upper Part

$w > w^*$    $\Theta_e = w - w^*$ $0 \leq \Theta_e < 2\pi$ $$w = \begin{cases} \dfrac{m_2 R + K_w}{I} w - \dfrac{K_\Theta}{I} \Theta_e + \dfrac{F_0 R + K_\Theta d + (m_1 R - m_2 R + K_w) w^*}{I} & \text{for } G > 0 \\ \dfrac{m_2 R}{I} w + \dfrac{F_0 R + (m_1 R - m_2 R) w^*}{I} & \text{for } G \leq 0 \end{cases}$$

Lower Part

$w \leq w^*$    $\Theta_e = w - w^*$ $0 \leq \Theta_e < 2\pi$ $$w = \begin{cases} \dfrac{m_1 R + K_w}{I} w - \dfrac{K_\Theta}{I} \Theta_e + \dfrac{F_0 R - K_\Theta d - K_w w^*}{I} & \text{for } G > 0 \\ \dfrac{m_1 R}{I} w + \dfrac{F_0 R}{I} & \text{for } G \leq 0 \end{cases}$$

Note: $K_\Theta = K_b K_s K_\Theta'$, $K_w = K_b K_s K_w'$, and $G = K_\Theta(\Theta_e + d) + K_w(w^* - w)$.

$$w = w^* + \frac{K_\Theta}{K_w} \Theta_e. \quad (24)$$

The locations of the equilibrium point and the corresponding eigenvalues are arranged and listed in TABLE 7.

TABLE 7

Equilibrium Points and Eigenvalues of ABS Dynamics using
Conventional PLL Algorithm with Pressure Bias d

| Ranges of w | Equilibrium Oiunts and Eigenvalues |
|---|---|

Upper Part

$w > w^*$ $w = w^*$ $$\Theta_e = \frac{1}{K_\Theta}(m_1 R w^* + F_0 R) - d$$

$$\lambda = \begin{cases} \frac{(m_2 R + K_w) \pm [(m_2 R + K_w)^2 + 4K_\Theta I]^{-\frac{1}{2}}}{2I} & \text{for } G > 0 \\ 0, \frac{m_2 R}{I} & \text{for } G \leq 0 \end{cases}$$

Lower Part

$w \leq w^*$ $w = w^*$ $$\Theta_e = \frac{1}{K_\Theta}(m_1 R w^* + F_0 R) - d$$

$$\lambda = \begin{cases} \frac{(m_1 R + K_w) \pm [(m_1 R + K_w)^2 + 4K_\Theta I]^{-\frac{1}{2}}}{2I} & \text{for } G > 0 \\ 0, \frac{m_1 R}{I} & \text{for } G \leq 0 \end{cases}$$

---

The fact that the pressure bias d can alter the location of the equilibrium point is obvious from TABLE 7. More specifically, it can shift the equilibrium point E horizontally by the amount of $-d$.

Figure 19:
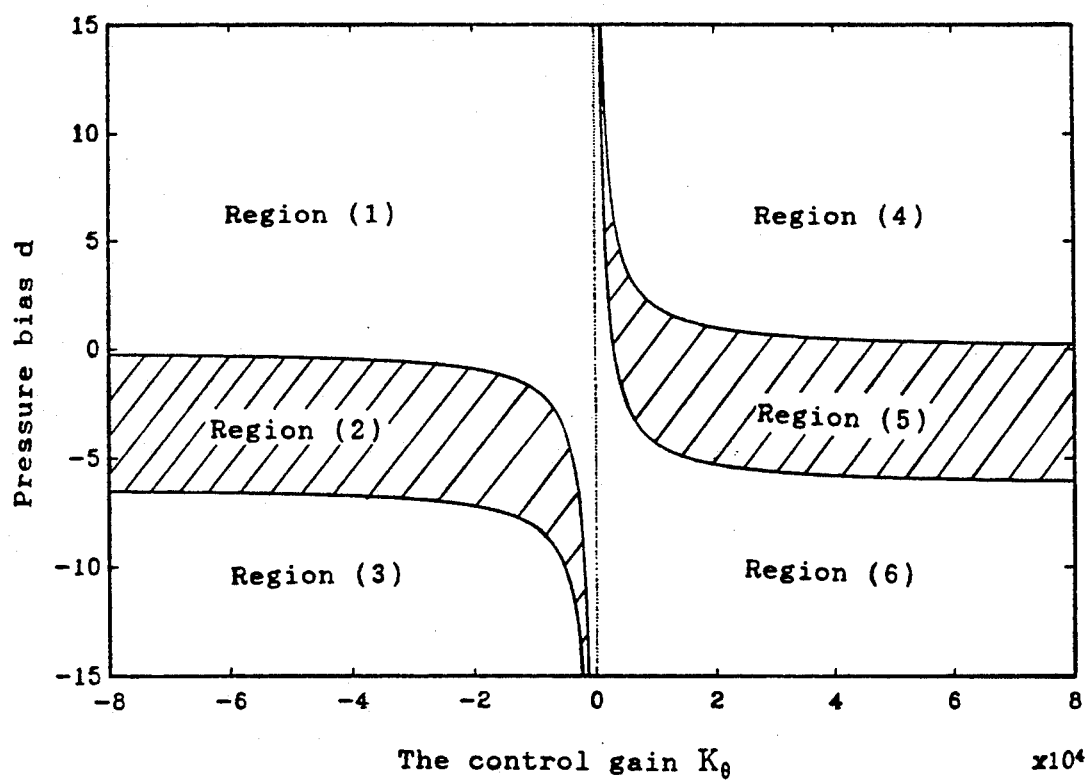
FIG. 19 is a graphical representation, showing the regions of the constraints for existence of equilibrium point.

It can be seen that the existence of the equilibrium point depends on the phase error control gain $K_\Theta$ and the pressure bias d, thus the system characteristics can be discussed on the $K_\Theta-d$ plane. The condition which guarantees for the existence of the equilibrium point is:

$$0 \leq \frac{1}{K_\Theta}(F_0 R + m_1 R w^*) - d < 2\pi, \quad (27)$$

and wherein only $K_\Theta$ and d lying in those regions represented by the shaded lines in FIG. 19 satisfy the conditions of Eq. (27). Denote them as region (2) and (5), which are defined mathematically as:

Region (2): $K_\Theta < 0$, and $$\frac{1}{K_\Theta}(F_0 R + m_1 R w^*) -2\pi < d < \frac{1}{K_\Theta}(F_0 R + m_1 R w^*),$$

Region (5): $K_\Theta > 0$, and $$\frac{1}{K_\Theta}(F_0 R + m_1 R w^*) -2\pi < d < \frac{1}{K_\Theta}(F_0 R + m_1 R w^*).$$

However, it is only a necessary condition that guarantees the wheel speed to track the reference signal with maximum brake force. The eigen-structure on each region is also an important factor to determine the stabilities of the whole system.

Comparing the eigenvalues listed in TABLE 5 and 7, it is obvious that the pressure bias d can not affect the eigenvalues of the system. Hence, the dynamics of whole system can be obtained by combining the state trajectories of upper and lower parts similar to what treated in last section except for the dc shift of by the amount of $-d$. With proper choices, it is possible to let all the state trajectories converge to $w^*$.

Not all the parameters in region (2) and (5) are useful. The nonlinear analysis on ABS dynamics in section 3.2 tells that the eigen-structures of the PLL type ABS are of saddle type for $K_\Theta > 0$, therefore the maximum brake force will never be obtained if $K_\Theta$ and d are chosen from region (5). If we choose $K_\Theta$ and d from region (2), there still exists some constraints. If d is chosen to be smaller than $-2\pi$, the absolute value of the error gain $K_\Theta$ must be designed to be a value small enough as shown in FIG. 19. Thus the choice of $K_\Theta$ will be severely restricted. If d is chosen to be too close to zero, the corresponding $K_\Theta$ must be chosen large enough and large control effort is required.

In spite of the effect on the location of the equilibrium point E, the pressure bias d can cause the axis of $T_b=0$ to be shifted horizontally. In fact, the $T_b=0$ axis shifts together with E accordingly. Since, when $T_b=0$, the related curve in the $\Theta_e-w$ plane is:

$$w = w^* + \frac{K_\Theta}{K_w}(\Theta_e + d), \quad (28)$$

and this Equation (28) represents a straight line which passes through the point $(-d, w^*)$. Comparing with the location of the equilibrium point as listed in TABLE 7, they are shifted by the same amount. Therefore, the relative distance of the peak of the RFx curve to the Tb=0 axis is independent of the pressure bias d. This argument is also supported by the fact that the pressure bias does not affect the eigen-structures of the system.

In order to describe the dynamic characteristics of the conventional PLL controlled ABS with the pressure bias d, an example with $d = -\pi$ is illustrated below.

3.4 Dynamics of ABS with Pressure Bias $d = -\pi$

The bifurcation sets in the $K_\Theta-K_w$ plane can be found similarly to section 2.3 as follows:

(1) $K_w = -m_2R - 2(K_\Theta \cdot I)^{\frac{1}{2}}$, due to the change of eigen-structure in upper part;

(2) $K_{wc} = H(K_{\Theta c})$, (where H is a real function of K) due to the hitting point coinciding the point $(2\pi, w^*)$;

(3) $K_w = -m_1R$, due to the change of eigen-structure in lower part;

(4) $K_\Theta = -(F_0R + m_1Rw^*)/\pi$, due to the existence of the equilibrium point;

(5) $K_\Theta = (F_0R + m_1Rw^*)/\pi$, due to the existence of the equilibrium point.

Figure 20:
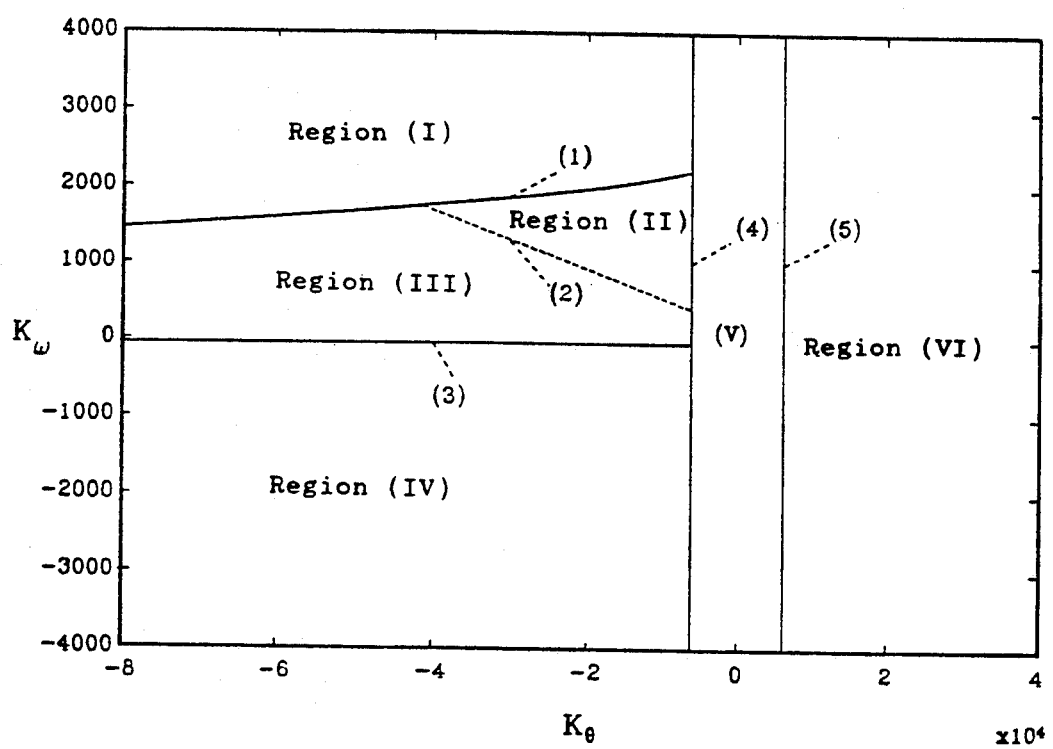
FIG. 20 is a graphical representation, showing the bifurcation sets of ABS with $d = -\pi$ using conventional PLL algorithm.

Those curves which describe the bifurcation sets are shown in FIG. 20. Henceforth, the $K_\Theta - K_w$ plane is divided into six regions by these sets and the dynamical behaviors of these regions are similar to those in section 2.3 and will be explained briefly below.

Figure 21A:
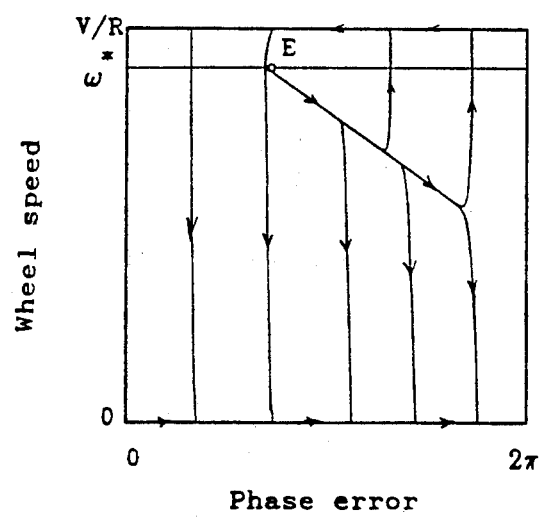
FIGS. 21A-21F are graphical representations, each showing respectively the phase portraits of ABS for region (I), (II), (III), (IV), (V), and (VI) with $d = -\pi$ using conventional PLL algorithm.

For the control gains in region (I), the wheel is locked always. The equilibrium point E in the lower part is an unstable node and in the upper part may behave as a focus or an unstable node. Therefore, all the state trajectories will not converge to E and, in fact, they will converge to a limit cycle with $w=0$ as shown in FIG. 21A.

Figure 21B:
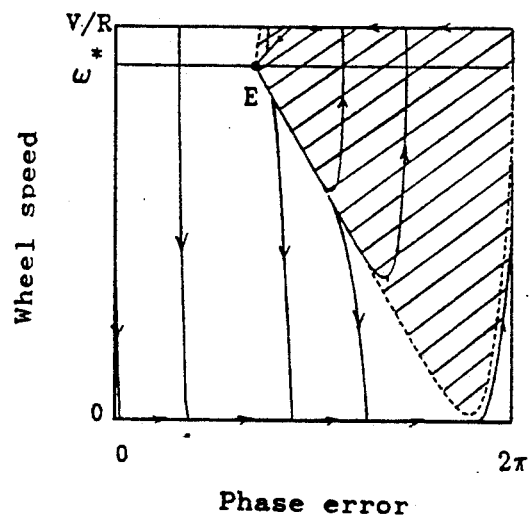

From region (I) to region (II), only the trajectories whose initial conditions locate in the stable region, shown by shaded are in FIG. 21B, will converge to E since E in the upper part is a stable node, otherwise they will tend to a limit cycle which make the wheel be locked for almost all of the time. This is because that the hitting point is lower than the point $(2\pi,w)$. However, those stable trajectories, if a little perturbation is done to the system, will deviate from E to the lower part since E in the lower part behave as an unstable node.

Figure 21C:
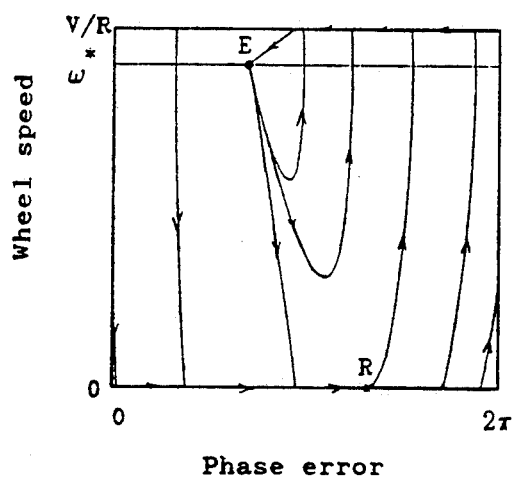

For the control gains in region (III), the system is weakly robust. FIG. 21C shows that all the trajectories will converge to E which is a stable node in the upper part, but if there is a little perturbation, they will leave E to the lower part of the $\Theta_e - w$ plane. However, they will come back and converge to E again since the hitting point is higher than the point $(2\pi,w^*)$.

Figure 21D:
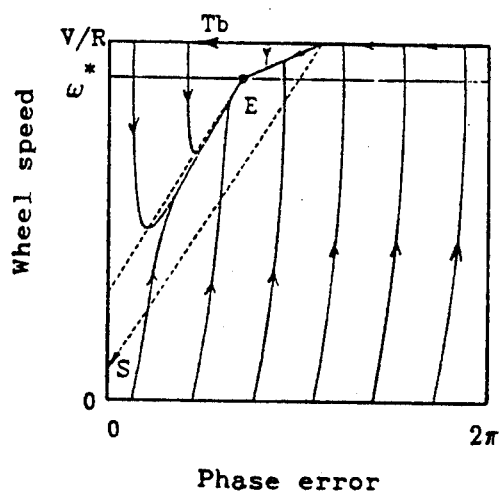

For the control gains in the region (IV), the wheel speed w will lock the reference signal $w^*$ and, hence, the maximum brake force is obtained. The equilibrium point E in both parts is stable. Therefore, all the state trajectories will converge to it as shown in FIG. 21D.

Figure 21E:
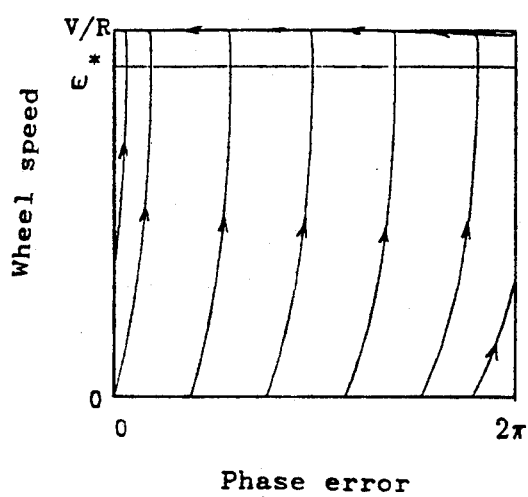

For the control gains in the region (V), the system will have the danger of being with no braking effort since the equilibrium points disappears. FIG. 21E shows that the state trajectories tend to a limit cycle and this means the wheel is freely rolling for most of the time.

Figure 21F:
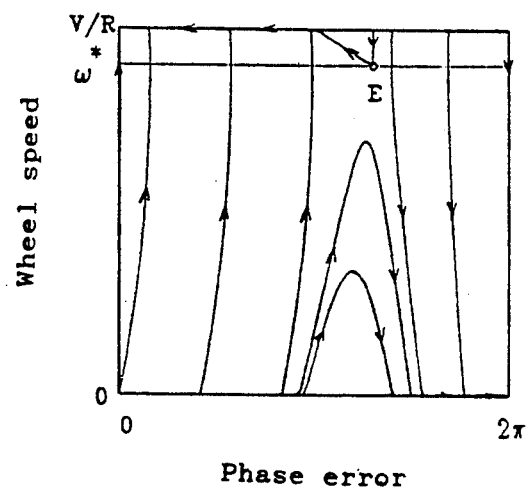
Figure 22:
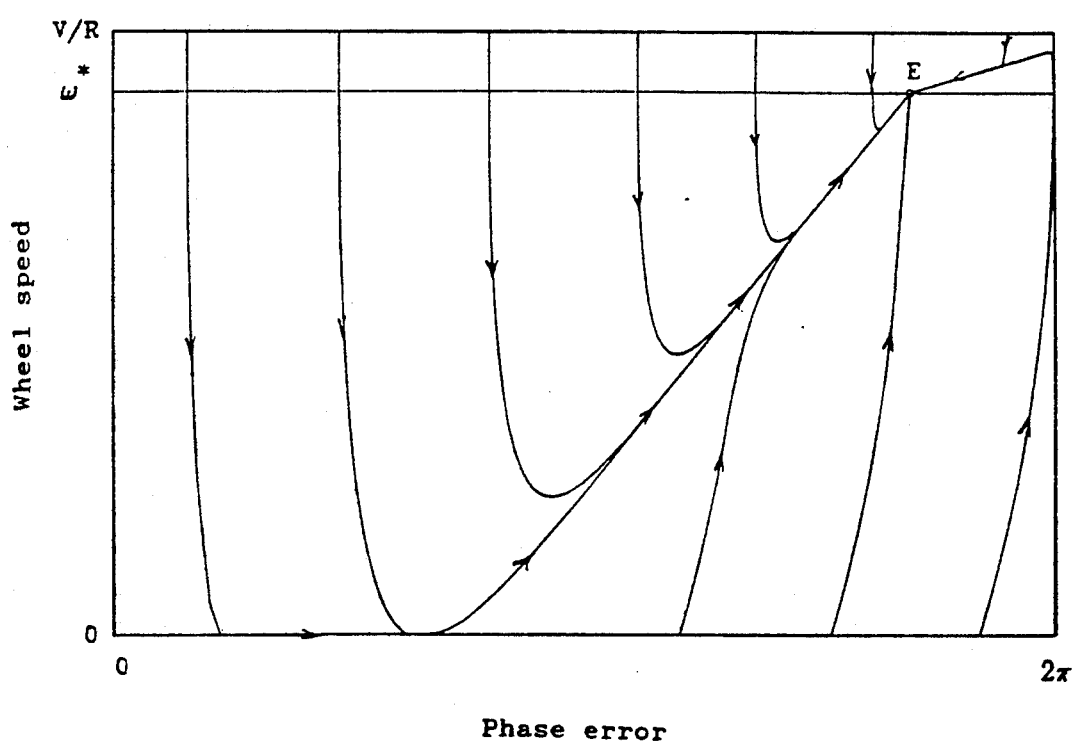
FIG. 22 is a graphical representation, showing the typical phase portraits of ABS with $d = -2\pi$ using conventional PLL algorithm.
Figure 23A:
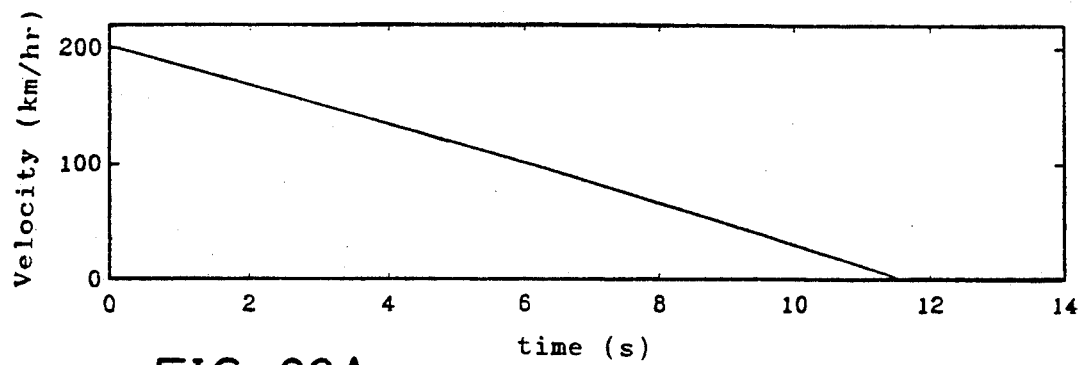
FIGS. 23A-23D are four graphs, showing the simulations for varying aircraft speed.
Figure 23B:
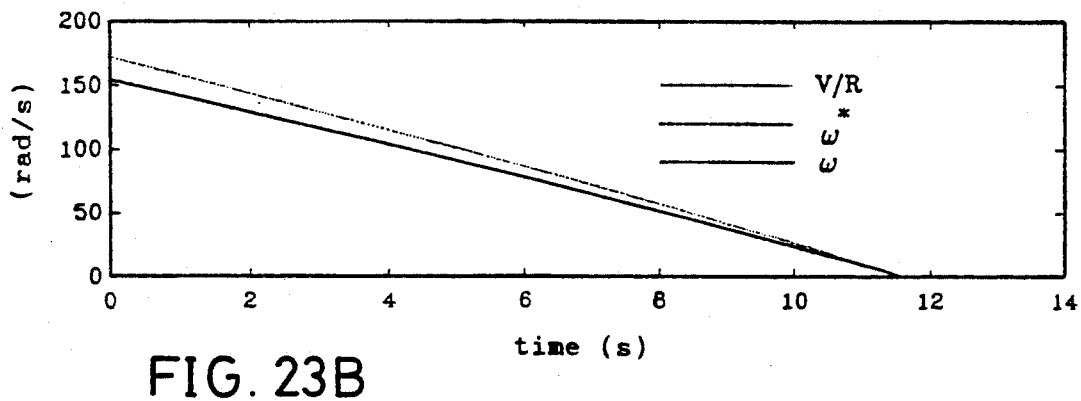
Figure 23C:
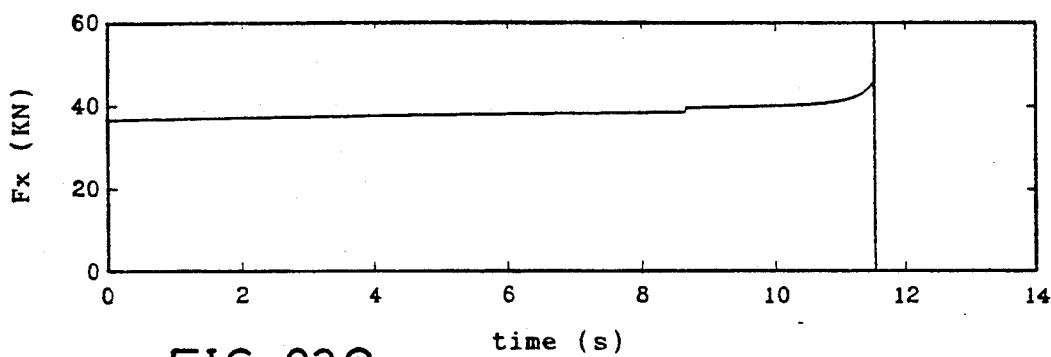
Figure 23D:
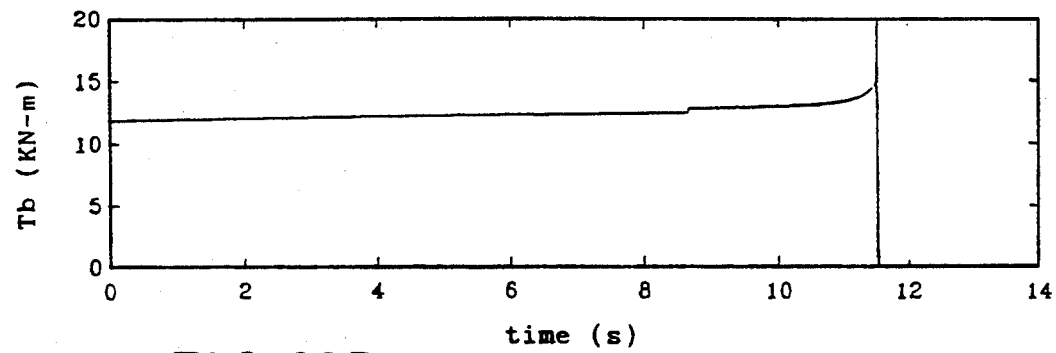
Figure 24A:
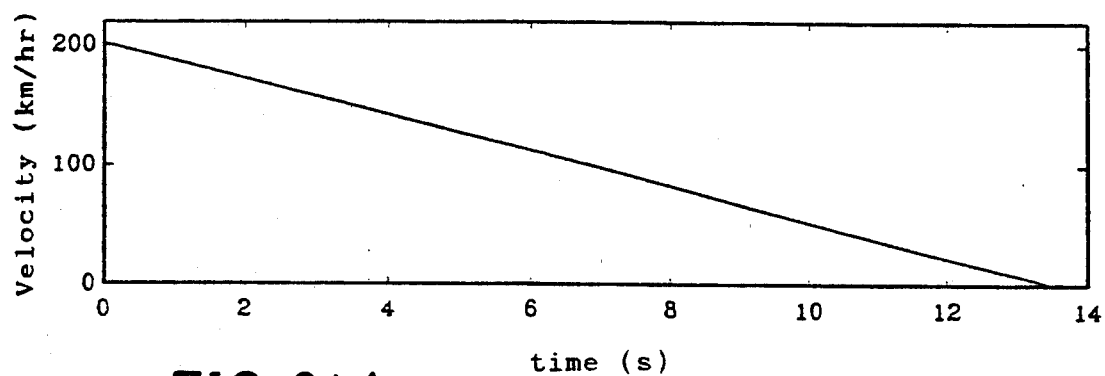
FIGS. 24A-24D are four graphs, showing the simulations using Dugoff tire model.
Figure 24B:
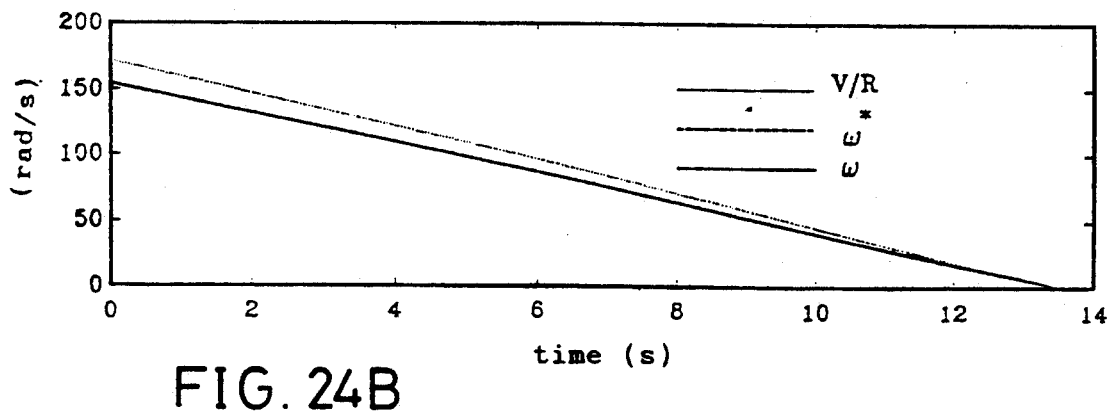
Figure 24C:
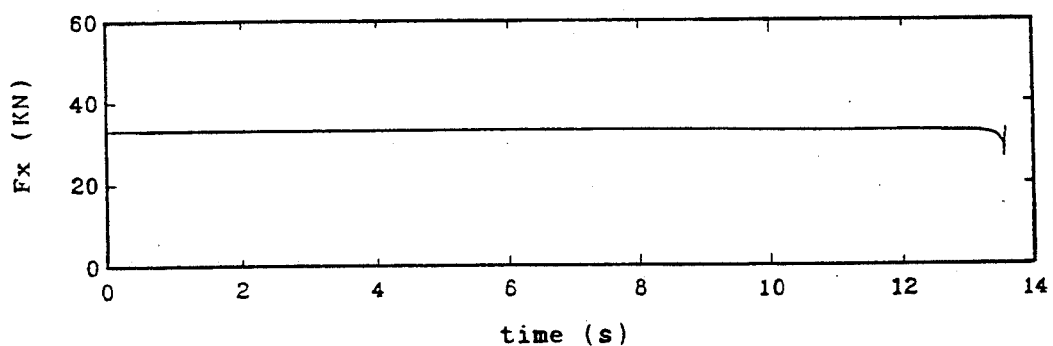
Figure 24D:
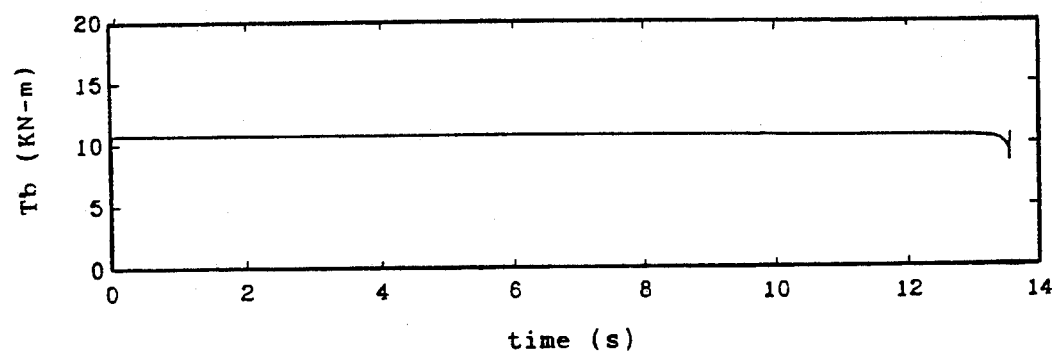
Figure 25A:
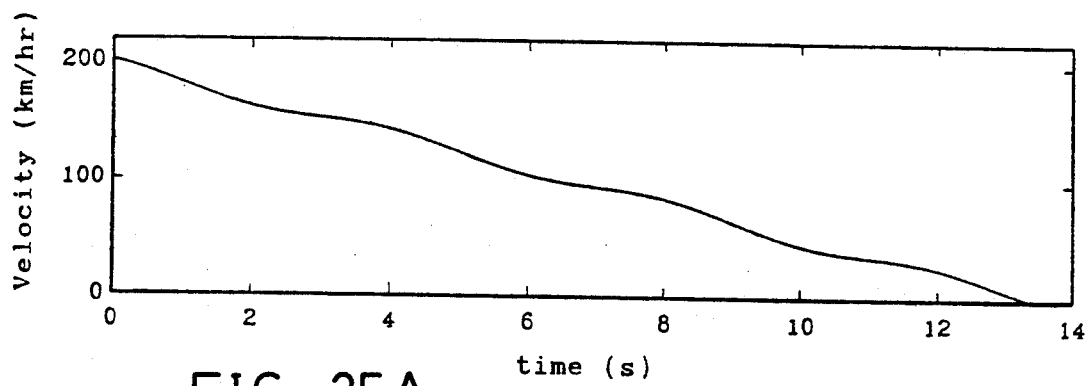
FIGS. 25A-25B are four graphs, showing the simulations for varying $\mu_0$.
Figure 25B:
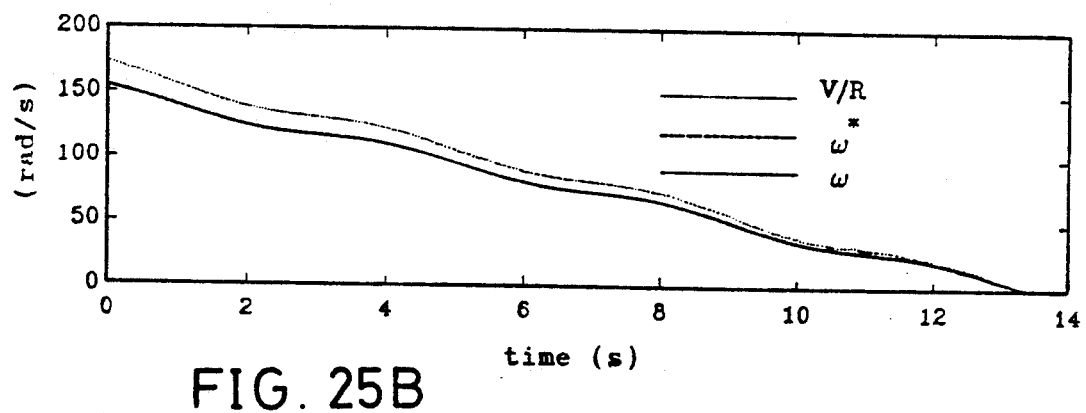
Figure 25C:
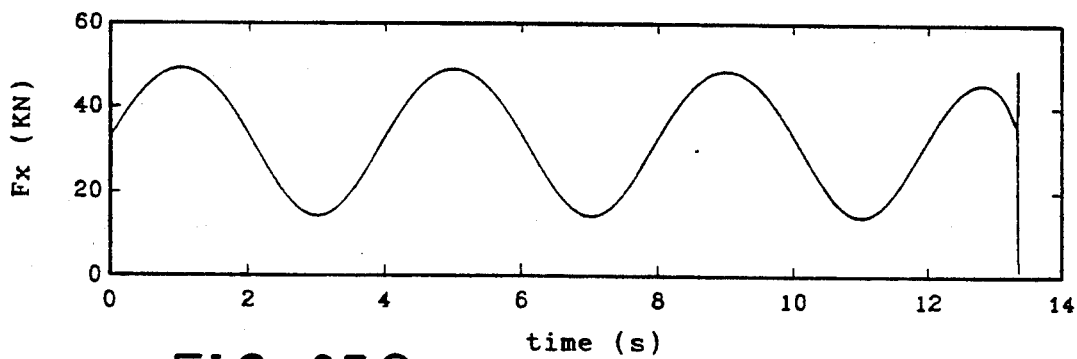
Figure 25D:
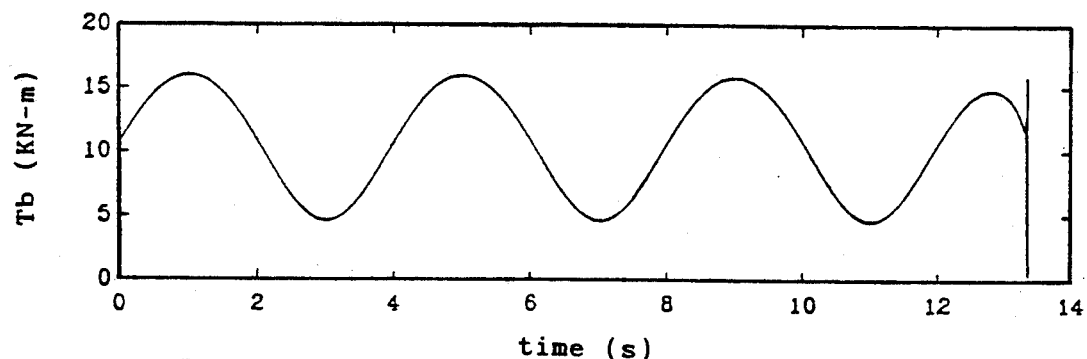

Finally, for the control gains in region (VI), the eigen-structures are saddle type for both parts as shown in FIG. 21F. The dynamics is similar to that of region (I) without the pressure bias d in the section 3.2.

Through the above demonstrations, the effects of the control gains $K_\Theta$ and $K_w$ for the case with $d = -\pi$ is explained. The guideline of choosing the control gains when the pressure bias is chosen to be $-\pi$ are suggested as follows:

(1) The proper choices of the control gains should be in region (IV);

(2) When the control gains in region (IV) are close to the bifurcation sets between other regions, the system will get less robust;

(3) The control gains in region (I) always cause the wheel to be locked;

(4) The control gains in region (II), (III),(V),and (VI) are forbidden;

(5) The choice of $K_\Theta$ can also be used to fit the maximum brake torque $T_b$ provided by the brake mechanism as mentioned in section 2.3.

It is concluded that the conventional PLL algorithm can still be applied on ABS if the pressure bias is added and the control parameters $K_\Theta$, $K_w$, and d are chosen properly.

4. Comparisons of the New and Conventional PLL Control Schemes on ABS

The schematics of ABS using the new control algorithm of PLL described in section 2 is that the main wheel speed is fed back positively to be compared with the reference signal. A pressure bias term is shown to be required for the conventional PLL control scheme of ABS in section 3. Both methods yield useful results. The phase portraits of the ABS dynamics using the conventional PLL algorithm have some resemblance to those of the new control scheme. It seems that these two control algorithms are similar to each other and, therefore, an analogy will be made between them.

From the wheel dynamics modelled in section 1, it is known that the changing rate of the main wheel speed depends on both the tire brake force $F_x$ and the brake torque $T_b$ as Eq. (15) shows. However, since $F_x$ is merely a function of the main wheel speed w, the wheel dynamics can only be controlled by the brake torque. More specifically, the main purpose of the PLL controlled ABS is to control the main wheel speed w to track the reference signal $w^*$ by the brake torque $T_b$. Hence, the emphasis is put on the brake torque $T_b$. It is possible that two schemes are exactly equivalent and the applied brake torques are identical for the two control schemes for the same error conditions.

The brake torque $T_b$ in the new PLL control scheme on ABS in introduced in Section 2 is related with the phase error and the main wheel speed w as:

$$T_b = \begin{array}{l} G(\Theta_e, w), \text{ for } G(\Theta_e, w) > 0, \\ 0 \quad \text{ for } G(\Theta_e, w) < 0, \end{array}$$

where the function G is $$G(\Theta_e, w) = K_\Theta \Theta_e + K_w(w - w^*),$$

and the phase error is defined as:

$$\Theta_e = w - w^*$$

While for the conventional PLL control scheme on ABS, in order to distinguish the notations used above, a new phase error $\Theta_e'$ is defined to rewrite the Eq. (20) as:

$$\Theta_e' = w - w^*, \tag{29}$$

Hence, $\Theta_e' = -\Theta_e$ and the brake torque $T_b$ is rewritten as $$T_b = \begin{array}{l} H(\Theta_e', w), \text{ for } H(\Theta_e', w) > 0, \\ 0 \quad \text{ for } H(\Theta_e', w) < 0, \end{array} \tag{30}$$

where $$H(\Theta_e', w) = K_{73}''(\Theta_e' + d) + K_w''(w^* - w). \tag{31}$$

It is desired that the function $H(\Theta_e', w)$ is equal to the function $G(\Theta_e, w)$, that is, $$K_\Theta''(-\Theta_e'+d)-K_w''(w^*-w)=K_\Theta\Theta_e+K_w(w-w^*). \quad (32)$$

Comparing the coefficient of the term $(w-w^*)$, $K_w''$ can be chosen as $-K_w$. Because the range of the phase error $\Theta_e$ is restricted to $2\pi$. Therefore, if the pressure bias d is chosen to be $-2\pi$, $K_\Theta''$ is equal to $-K_\Theta$.

Therefore, we conclude that these two control schemes of PLL are equivalent if the pressure bias d is chosen to be $-2\pi$. The absolute values of the phase error control gains are same in both PLL control schemes, and so the frequency error control gains. The only difference is the sign changes since it must satisfy the concept of negative feedback.

The phase portraits of the conventional PLL controlled ABS with the pressure bias $d=-2\pi$ can be imagined from those in section 2. Since the defined phase error $\Theta_e''$ is the minus of $\Theta_e$, the $\Theta_e$ range of 0 to $2\pi$ is changed to the range of 0 to $-2\pi$. By reflecting the phase portraits of the new PLL control scheme on ABS about the axis of $\Theta_e=0$, those of the case with $d=-2\pi$ are obtained if we take $K_\Theta''=-K_\Theta$ and $K_w''=-K_w$. The corresponding bifurcation sets are identical except for the signs of the control gains change. Taking an example for illustration, the state trajectories of the conventional PLL controlled ABS is drawn in FIG. 22 with $K_\Theta''=-20,000$ and $K_w''=-1,000$, which is exactly the mirror image of FIG. 8 with respect to the axis $\Theta_e=0$. And the equivalence of the two control schemes is verified.

5. Simulations of Aircraft Motion

5.1 Simulations for Varying Aircraft Speed

In section 1, the linear velocity of aircraft is assumed to be a slow-varying variable compared with the response of the wheel speed and is therefore considered as a constant. Based on this assumption, the ABS dynamics has been discussed and the angular speed of the main wheel can track successfully the angular speed of the nose wheel by using properly chosen the control gains. However, are these chosen control gains still work when the linear velocity of aircraft is varying? This question will be discussed below by simulation including the aircraft dynamics.

The equations of motion of the aircraft can be written as:

$$M\dot{V}=-F_x, \quad (33)$$

where M is total mass of aircraft. Equation (1) is still valid since $S^*$ is chosen to be 0.1 and $K^*$ is a constant. The dynamical equations become third-order as:

$$\begin{aligned}\dot\Theta_e &= w - w^*, \\ J\dot w &= F_x R - T_b, \text{ and} \\ M\dot V &= -F_x\end{aligned} \quad (34)$$

From the above equations and control gains chosen based on the suggested guidelines, the simulation results based on the piecewise linear tire model are shown in FIGS. 23A-23D with $K_\Theta=10,000$ and $K_w=40,000$. It can be found that the linear velocity of aircraft decelerates from 200 km/hr to stop in 11.8 seconds and the main wheel can track the reference speed signal from the nose wheel during the whole braking process. The tire brake force and the brake torque are nearly constant except when the linear velocity of aircraft is near zero. In fact, when the aircraft velocity is small enough, the usual procedure is to lock the main wheel since it will not have the danger of skid. It can be concluded that the PLL control scheme can also be applied to ABS even if the velocity of aircraft is varying.

From the processes of simulations, an interesting fact is discovered. When the aircraft is landing, the up-down counter 34 had better be set to be nearly full at touch down. Otherwise, if it is set to be empty, i.e. the output phase error is zero, and the wheel speed is free rolling, the wheel speed is controlled to track $w^*$ from the upper part in $\Theta_e-w$ phase plane. While, according to the decreasing velocity of the aircraft, the reference signal $w^*$ will decrease and the main wheel speed is difficult to track $w^*$ from the lower part and, hence with decreasing $w^*$, the main wheel speed will track $w^*$ more easily. From other point of view, the control effort ought to be maximum as aircraft starts to land and the phase error must be maintained to be maximum since the brake torque is directly related to the phase error. However, the up-down counter 34 can not be set to be too much near full, since a disturbance or the transient response will possibly make it overflow and will reset it to the empty state.

5.2 Simulations Using Dugoff Tire Model

The piecewise linear tire force model is utilized in the simulation of the PLL controlled ABS in the last section with the corresponding parameters derived from the Duggof nonlinear tire model. With the same control gains and parameters, the simulations of the PLL control scheme using the Dugoff tire force model are drawn in FIGS. 24A-24D. It tells that the linear velocity of aircraft still decreases to stop with the main wheel tracking the reference speed signal from the nose wheel during braking.

Comparing FIGS. 23A-23D with FIGS. 24A-24D, it can be found that for the Dugoff tire force model the aircraft will come to a stop slower than in the case with piecewise linear model. This is because the latter one has a peak at $w^*$ which is estimated larger than the maximum values of the Dugoff tire model.

5.3 Simulations for Varying Velocities

The runway condition was assumed previously to be invariable. However, if the runway condition is changing i.e. the static friction coefficients $\mu_0$ between the runway and the main wheel are varied, the feasibility of our PLL control scheme will be justified. The coefficient $\mu_0$ is assumed to be alternating sinusoidally with respect to time here and the simulation results using the Dugoff tire model is shown in FIGS. 25A-25D. It can be found that the aircraft is stopped with the angular speed of the main wheel successfully tracking the reference speed signal from the nose wheel. The tire force and the brake torque are seen to be alternating sinusoidally in response to the change of the runnway conditions. It also proves that the PLL control scheme can still be used on ABS for different runway condition.

What is claimed is:

1. An anti-skid brake control system for controlling brake mechanisms of a vehicle, the vehicle having at least a first wheel and at least a second wheel, when braking the vehicle the brake mechanisms applying a brake force to the second wheel and the first wheel being under free rolling, the brake control system comprising:

a first wheel speed detector mounted on the first wheel and capable of sending out a periodic first signal, the frequency of which indicating the angular speed of the first wheel;

a second wheel speed detector mounted on the second wheel and capable of sending out a periodic second signal, the frequency of which indicating the angular speed of the second wheel;

a frequency error detector, responsive to the first signal and the second signal, for generating an output frequency error voltage in proportion to the difference between the frequency of the first signal and the second signal;

a phase error detector, responsive to the first signal and the second signal, for generating an output phase error voltage in proportion to the phase error between the first signal and the second signal;

summing means, coupled to said frequency error detector and said phase error detector, for generating an output control voltage, the magnitude of the control voltage being the summation of the frequency error voltage, the phase error voltage, and a predetermined bias voltage;

means, responsive to the control voltage, for driving the brake mechanisms to apply a brake force in accordance with the control voltage to the second wheel.

2. An anti-skid brake control system as claimed in claim 1, wherein each of said wheel speed detectors comprises:

a circular disk made of ferromagnetic material and having a plurality of gear-like teeth provided around the circumference thereof; and a permanent magnet wound by a coil along the direction of magnetic flux thereof, said coil having two free ends;

wherein, as said circular disk rotates, each tooth thereof will pass through the magnetic field of said permanent magnet such that an electrical potential is induced across said two free ends of said coil.

3. An anti-skid brake control system as claimed in claim 2, wherein each of said wheel speed detectors further comprises a Schmitt trigger having two input ports connected to said two free ends of said coil, for converting the waveform of the signal taken from said two free ends of said coil into a square waveform.

4. An anti-skid brake control system as claimed in claim 1, wherein said frequency error detector comprises:

a pair of frequency/voltage converters, each of which having an input port and an output port, capable of generating an output voltage, the magnitude of the output voltage being in proportion to the frequency of a signal input to said frequency/voltage converters;

a difference amplifier having two input ports and an output port, the two input ports being connected respectively to each of the output ports of said two frequency/voltage converters, said difference amplifier being capable of generating an output voltage, the magnitude of the output voltage being the difference between the magnitude of the voltages of the two input signals.

5. An anti-skid brake control system as claimed in claim 1, wherein said phase error detector comprises:

(A) an up-down digital counter having
a first input port for receiving a bit stream thereinto,
a second input port for receiving a bit stream thereinto,
a register for storing a binary data, and
an output data bus for outputting the binary data stored in the register in parallel; and
wherein as the first input port of said up-down digital counter receives a bit representing digit 1, said up-down digital counter will add 1 to the binary data stored in the register; and
wherein as the second input port of said up-down digital counter receives a bit representing digit 1, said up-down digital counter will subtract 1 from the binary data stored in the register; and (B) a digital/analog converter coupled to the output bus of said up-down digital counter and having an analog output the magnitude of which is proportional to the value of the binary data stored in the register.

6. An anti-skid brake control system as claimed in claim 5, wherein said phase error detector further comprises:

a voltage source;

a summing amplifier having two input ports and an output port, one of the two input ports being connected to the output port of said digital/analog converter and the other input port being connected to said voltage source, the output of said summing amplifier being a voltage and the magnitude of which is the summation of the magnitude of the voltage of each of the input signals.

* * * * *